(12) United States Patent
Lee et al.

(10) Patent No.: US 11,980,231 B2
(45) Date of Patent: May 14, 2024

(54) AEROSOL GENERATING SYSTEM AND METHOD OF OPERATING THE SAME

(71) Applicant: KT&G CORPORATION, Daejeon (KR)

(72) Inventors: Seung Won Lee, Gwangmyeong-si (KR); Sung Wook Yoon, Suwon-si (KR); Sang Kyu Park, Hwaseong-si (KR); Jong Sub Lee, Seongnam-si (KR)

(73) Assignee: KT&G CORPORATION, Daejeon (KR)

( * ) Notice: Subject to any disclaimer, the term of this patent is extended or adjusted under 35 U.S.C. 154(b) by 714 days.

(21) Appl. No.: 17/048,399

(22) PCT Filed: Jan. 15, 2020

(86) PCT No.: PCT/KR2020/000720
§ 371 (c)(1),
(2) Date: Oct. 16, 2020

(87) PCT Pub. No.: WO2020/149634
PCT Pub. Date: Jul. 23, 2020

(65) Prior Publication Data
US 2021/0169145 A1 Jun. 10, 2021

(30) Foreign Application Priority Data

Jan. 15, 2019 (KR) .................. 10-2019-0005229
Jul. 8, 2019 (KR) .................. 10-2019-0082228

(51) Int. Cl.
*A24F 40/90* (2020.01)
*A24F 40/20* (2020.01)
(Continued)

(52) U.S. Cl.
CPC ............ *A24F 40/465* (2020.01); *A24F 40/20* (2020.01); *A24F 40/57* (2020.01); *A24F 40/90* (2020.01);
(Continued)

(58) Field of Classification Search
CPC ........ A24F 40/465; A24F 40/57; A24F 40/90; H02J 7/02–50/12; H02J 50/90; H05B 6/36
See application file for complete search history.

(56) References Cited

U.S. PATENT DOCUMENTS 9,717,277 B2    8/2017   Mironov
9,901,117 B2 *   2/2018   Levitz .................... H02J 50/90
(Continued)

FOREIGN PATENT DOCUMENTS

CA     3 034 152 A1    3/2018
CN     102347640 A    2/2012
(Continued)

OTHER PUBLICATIONS

Office Action dated Apr. 5, 2022 from the Japanese Patent Office in JP Application No. 2020-558005.
(Continued)

*Primary Examiner* — Anessa Girardi
(74) *Attorney, Agent, or Firm* — Sughrue Mion, PLLC

(57) ABSTRACT

An aerosol generating system includes an aerosol generating device including an induction coil that performs a heating operation for heating a susceptor arranged in a cigarette insertion portion and a charging operation for receiving electric power from the outside to charge a power supply, and a charging device including a transmission coil that transmits electric power to the induction coil.

13 Claims, 14 Drawing Sheets

(51) Int. Cl.
  *A24F 40/465* (2020.01)
  *A24F 40/57* (2020.01)
  *H02J 7/02* (2016.01)
  *H02J 50/12* (2016.01)
  *H02J 50/90* (2016.01)
  *H05B 6/36* (2006.01)

(52) U.S. Cl.
  CPC ............... *H02J 7/02* (2013.01); *H02J 50/12* (2016.02); *H02J 50/90* (2016.02); *H05B 6/36* (2013.01)

(56) References Cited

U.S. PATENT DOCUMENTS

| | | | |
|---|---|---|---|
| 10,015,986 | B2 | 7/2018 | Cadieux et al. |
| 10,806,181 | B2 * | 10/2020 | Sur ....................... A24F 40/465 |
| 10,945,462 | B2 * | 3/2021 | Davis ..................... A24F 40/90 |
| 11,516,894 | B2 * | 11/2022 | Gill ........................... H02J 7/02 |
| 11,522,388 | B2 * | 12/2022 | Dani ..................... H02J 7/0045 |
| 2014/0020697 | A1 | 1/2014 | Liu |
| 2014/0224267 | A1 | 8/2014 | Levitz et al. |
| 2019/0297947 | A1 | 10/2019 | Bessant et al. |
| 2023/0081081 | A1 | 3/2023 | Gill |

FOREIGN PATENT DOCUMENTS

| | | | | |
|---|---|---|---|---|
| CN | 105191050 | A | 12/2015 | |
| CN | 105307526 | A | 2/2016 | |
| CN | 106998082 | A | 8/2017 | |
| CN | 206727738 | U | 12/2017 | |
| CN | 207783193 | U | 8/2018 | |
| CN | 108631416 | A | 10/2018 | |
| CN | 111052858 | A | 4/2020 | |
| EP | 2668858 | A1 | 12/2013 | |
| EP | 2 903 245 | A1 | 8/2015 | |
| JP | 2014-504142 | A | 2/2014 | |
| JP | 2020-532314 | A | 11/2020 | |
| KR | 1020140114554 | A | 9/2014 | |
| KR | 10-2015-0134332 | A | 12/2015 | |
| KR | 1020150143885 | A | 12/2015 | |
| KR | 10-1648324 | B1 | 8/2016 | |
| KR | 10-2017-0035962 | A | 3/2017 | |
| KR | 10-2018-0100317 | A | 9/2018 | |
| WO | 2017/001819 | A1 | 1/2017 | |
| WO | 2018/127484 | A1 | 7/2018 | |
| WO | 2019/048379 | A1 | 3/2019 | |
| WO | WO-2019048379 | A1 * | 3/2019 | ........... A24F 40/465 |

OTHER PUBLICATIONS

Office Action dated Mar. 31, 2023 from the Chinese Patent Office in Application No. 202080001791.3.
Extended European Search Report dated Feb. 13, 2023 in Application No. 22217032.6.
Communication dated Feb. 26, 2021 from the Taiwanese Patent Office in Application No. 109101344.
Communication dated Jun. 2, 2021, from the Korean intellectual property office in application No. 10202135247.
Extended European Search Report dated Oct. 5, 2021 in European Application No. 20741816.1.
Notice of Reasons for Refusal dated Oct. 12, 2021 from the Japanese Patent Office in Japanese Application No. 2020-558005.
Korean Notice of Non-Final Rejection for KR 10-2019-0005229 dated Aug. 21, 2020.
International Search Report for PCT/KR2020/000720 dated Sep. 9, 2020 [PCT/ISA/210].
Written Opinion for PCT/KR2020/000720 dated Sep. 9, 2020 [PCT/ISA/237].
Decision to refuse issued in the China National Intellectual Property Administration on Mar. 19, 2024 in corresponding CN Patent Application No. 202080001791.3.
Xu Yinxin et al., "Wireless Charging Technology and the Future of Power Transmission", pp. 110-115, published by Beijing Institute of Technology Society, Jan. 2018.

* cited by examiner

AEROSOL GENERATING SYSTEM AND METHOD OF OPERATING THE SAME

CROSS REFERENCE TO RELATED APPLICATIONS

This application is a National Stage of International Application No. PCT/KR2020/000720 filed Jan. 15, 2020, claiming priority based on Korean Patent Application No. 10-2019-0005229 filed Jan. 15, 2019 and Korean Patent Application No. 10-2019-0082228 filed Jul. 8, 2019.

TECHNICAL FIELD

One or more embodiments of the present disclosure relate to an aerosol generating system, and more particularly, to an aerosol generating system that generates an aerosol through induction heating, and a method of operation of the same.

BACKGROUND ART

Recently, the demand for alternative methods to overcome the shortcomings of general cigarettes has increased. Accordingly, there is growing demand for a method of generating aerosol by heating an aerosol generating material in cigarettes, rather than by burning cigarettes.

Research has actively been conducted lately on a method of generating an aerosol within a heating-type aerosol generating device by applying a magnetic field to a susceptor such that the susceptor is heated by electromagnetic induction to generate an aerosol.

DESCRIPTION OF EMBODIMENTS

One or more embodiments of the present disclosure provide an aerosol generating system including an aerosol generating device including a coil that performs a charging operation for receiving electric power to charge a power supply and a heating operation for heating a susceptor, and a charging device for transmitting electric power.

Embodiments of the present disclosure are not limited thereto. It is to be appreciated that other embodiments will be apparent to those skilled in the art from consideration of the specification and the accompanying drawings of the present disclosure described herein.

Solution to Problem

According to an aspect of the present disclosure, there is provided an aerosol generating system including an aerosol generating device including an induction coil that performs a heating operation for heating a susceptor arranged in a cigarette insertion portion and a charging operation for receiving electric power from the outside to charge a power supply, and a charging device including a transmission coil that transmits electric power to the induction coil.

The aerosol generating device may selectively perform the heating operation or the charging operation through the induction coil.

The charging device may further include a first impedance matching portion connected to the transmission coil, the aerosol generating device may further include a second impedance matching portion connected to the induction coil, and an impedance value of the second impedance matching portion may be a value between an impedance value of the susceptor and an impedance value of the first matching portion.

The aerosol generating device may further include a heating impedance matching portion having a first impedance value for applying a magnetic field to the susceptor during the heating operation, and a reception impedance matching portion having a second impedance value for receiving electric power from the charging during the charging operation, and the charging device may further include a transmission impedance matching portion that is connected to the transmission coil and has the second impedance value.

For the charging operation, the induction coil and the transmission coil may be aligned such that their central axes coincide with each other.

In addition, for the charging operation, the induction coil and the transmission coil may be arranged to overlap at least in part.

Moreover, for the charging operation, the transmission coil may be inserted into the cigarette insertion portion.

The cigarette insertion portion of the aerosol generating device may include a first empty space, the susceptor may protrude from a bottom surface of the first empty space, the charging device may include a protrusion portion around which the transmission coil is wound and a second empty space formed in the protrusion portion, and for the charging operation, the protrusion portion may be inserted into the first empty space, and the susceptor may be inserted into the second empty space.

When the charging device is coupled for the charging operation, the induction coil and the transmission coil may be separated by a certain distance from each other in an axial direction.

According to another aspect of the present disclosure, there is provided an aerosol generating device including: a cigarette insertion portion into which a cigarette is inserted; a susceptor arranged in the cigarette insertion portion; a power supply; an induction coil that performs a heating operation for heating the susceptor by applying a magnetic field to the susceptor and a charging operation for receiving electric power to charge the power supply according to a magnetic field applied from an external power source; and a controller for controlling operation of the induction coil.

The aerosol generating device may further include a heating impedance matching portion having a first impedance value for applying a magnetic field to the susceptor during the heating operation, and a reception impedance matching portion having a second impedance value for receiving electric power from the external power source during the charging operation.

The aerosol generating device may further include a switch that selectively connects the induction coil to the heating impedance matching portion or the reception impedance matching portion.

According to another aspect of the present disclosure, there is provided a charging device including a transmission coil that transmits electric power by generating a magnetic field according to flow of a current; and a controller that transmits electric power to an induction coil of an aerosol generating device by controlling the current, wherein the induction coil of the aerosol generating device performs a heating operation for heating a susceptor and a charging operation for receiving electric power to charge a power supply according to an applied magnetic field.

The charging device may further include: a protrusion portion around which the transmission coil is wound; an empty space formed in the protrusion portion; and a shield member arranged along an inner surface of the empty space to prevent the magnetic field generated by the transmission coil from being transmitted into the empty space.

The charging device may include the shield member including the transmission coil, and the transmission coil may be separated by a certain distance from the induction coil in an axial direction for the charging operation.

According to another aspect of the present disclosure, there is provided a method of operation of an aerosol generating device, the method including selecting any one of a charging mode for receiving electric power from the outside through an induction coil to charge a power supply or a heating mode for heating a susceptor by generating a magnetic field in the induction coil, and receiving electric power through the induction coil or heating the susceptor through the induction coil, according to a selected mode.

According to another aspect of the present disclosure, there is provided an aerosol generating system including a holder that heats an aerosol generating material to generate an aerosol, and a cradle that includes a cavity in which the holder is accommodated, wherein the holder may include a holder battery and a holder power receiver connected to the holder battery, and the cradle may include a cradle battery and a cradle power transmitter connected to the cradle battery. The holder power receiver may receive electric power wirelessly from the cradle power transmitter to charge the holder battery, and the location of the cradle power transmitter may be changed according to whether the holder is accommodated in the cavity or not.

The cradle may include a first side in parallel to a lengthwise direction of the cradle and a second side perpendicular to the first side, and the cradle power transmitter may be moved between a first position inside the cradle opposite the first side and a second position inside the cradle opposite the second side.

As the cradle power transmitter is moved between the first position and the second position, the shape of the cradle power transmitter may be changed.

When the holder is accommodated in the cavity, the cradle power transmitter is located at the first position inside the cradle opposite the first side, and when the holder is not accommodated in the cavity, the cradle power transmitter is located at the second position inside the cradle opposite the second side.

The cradle may further include a holder accommodation detection sensor for detecting whether the holder is accommodated in the cavity or not, and when the holder accommodation detection sensor detects that the holder is accommodated in the cavity, the cradle power transmitter may be moved from the second position to the first position.

The holder may include a third side on which the holder power receiver is positioned, and when the holder is not accommodated in the cavity, as the third side of the holder is positioned on the second side of the cradle such that the holder power receiver faces the cradle power transmitter, the holder power receiver may receive electric power wirelessly from the cradle power transmitter.

The holder may include the third side on which the holder power receiver is positioned, and when the holder is accommodated in the cavity, as the third side of the holder is positioned on the first side of the cradle such that the holder power receiver faces the cradle power transmitter, the holder power receiver may receive electric power wirelessly from the cradle power transmitter.

A first seating groove corresponding to the curvature of the holder may be formed on the second side of the cradle such that the holder is seated.

The cradle power transmitter may include a flexible printed circuit board (FPCB), and a coil on the FPCB, and when the cradle power transmitter is located at the first position, the FPCB may have a curved shape to correspond to the curvature of the first side, and when the cradle power transmitter is located at the second position, the FPCB may have a flat shape.

The holder power receiver may include a FPCB, and a coil on the FPCB, and the FPCB may have a curved shape to correspond to the curvature of the third side.

The cradle power transmitter may include a FPCB, and a coil on the FPCB, and when the cradle power transmitter is located at the first position, the FPCB may have a curved shape to correspond to the curvature of the first side, and when the cradle power transmitter is located at the second position, the FPCB may have a curved shape to correspond to the curvature of the first seating groove.

The aerosol generating device may further include a wireless charging pad including an external power transmitter, and the cradle may further include a cradle power receiver. As the holder or the cradle is seated on one side of the wireless charging pad, the holder power receiver or the cradle power receiver may receive electric power wirelessly from the external power transmitter to charge the holder battery or the cradle battery.

A second seating groove corresponding to the curvature of the holder or the cradle may be formed on one side of the wireless charging pad such that the holder or the cradle is seated.

The external power transmitter may include a FPCB, and a coil on the FPCB, and the FPCB may have a curved shape to correspond to the curvature of the second seating groove.

As the cradle in which the holder is accommodated is seated on one side of the wireless charging pad, the holder power receiver may receive electric power wirelessly from the cradle power to charge the holder battery, and the cradle power receiver may receive electric power wirelessly from the external power transmitter to charge the cradle battery.

According to another aspect of the present disclosure, there is provided a cradle including: a cavity in which a holder is accommodated; a battery; and a power transmitter connected to the battery, wherein the location of the power transmitter is changed according to whether the holder is accommodated in the cavity or not.

Advantageous Effects of Disclosure

According to an embodiment, a charging operation for receiving electric power and a heating operation for heating a susceptor are performed through a coil of an aerosol generating device, thus the aerosol generating device may be simplified and miniaturized, and user convenience may be improved.

According to an embodiment, a power transmitter of a cradle is moved according to whether a holder is accommodated in a cavity of the cradle, so that a power receiver of the holder and the power transmitter of the cradle may be arranged to face each other in either case. Thus, when the power receiver of the holder receives electric power wirelessly from the power transmitter of the cradle, charging efficiency of a holder battery may be improved.

According to an embodiment, the power receiver of the holder and the power transmitter of the cradle include FPCBs, so that the power receiver of the holder and the power transmitter of the cradle may be curved. Thus, a corresponding area between the power receiver of the holder and the power transmitter of the cradle is increased, so that charging efficiency of a holder battery is increased when the power receiver of the holder receives electric power wirelessly from the power transmitter of the cradle.

Embodiments of the present disclosure are not limited thereto. It is to be appreciated that other embodiments will be apparent to those skilled in the art from consideration of the specification and the accompanying drawings of the present disclosure described herein.

BEST MODE

Figure 1:
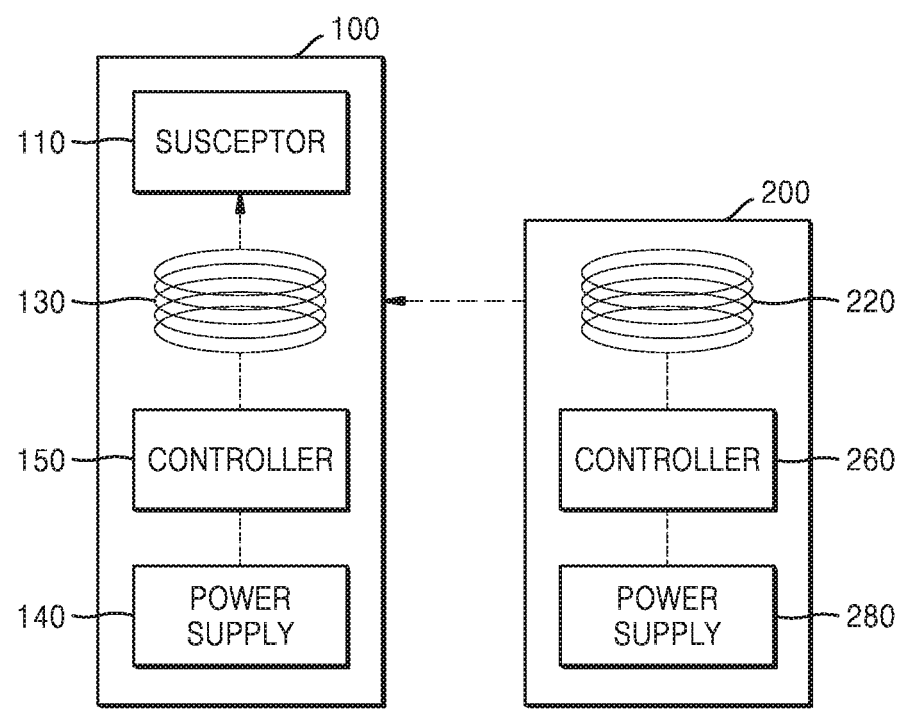
FIG. 1 is a diagram illustrating an aerosol generating system, according to an embodiment of the present disclosure.

According to an aspect of the present disclosure, there is provided an aerosol generating system including an aerosol generating device including an induction coil that performs a heating operation for heating a susceptor arranged in a cigarette insertion portion and a charging operation for receiving electric power from the outside to charge a power supply, and a charging device including a transmission coil that transmits electric power to the induction coil.

According to another aspect of the present disclosure, there is provided an aerosol generating device including: a cigarette insertion portion into which a cigarette is inserted; a susceptor arranged in the cigarette insertion portion; a power supply; an induction coil that performs a heating operation for heating the susceptor by applying a magnetic field to the susceptor and a charging operation for receiving electric power to charge the power supply according to a magnetic field applied from an external power source; and a controller for controlling operation of the induction coil.

According to another aspect of the present disclosure, there is provided a charging device including a transmission coil that transmits electric power by generating a magnetic field according to flow of a current; and a controller that transmits electric power to an induction coil of an aerosol generating device by controlling the current, wherein the induction coil of the aerosol generating device performs a heating operation for heating a susceptor and a charging operation for receiving electric power to charge a power supply according to an applied magnetic field.

According to another aspect of the present disclosure, there is provided a method of operation of an aerosol generating device, the method including selecting any one of a charging mode for receiving electric power from the outside through an induction coil to charge a power supply or a heating mode for heating a susceptor by generating a magnetic field in the induction coil, and receiving electric power through the induction coil or heating the susceptor through the induction coil, according to a selected mode.

Mode of Disclosure

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Throughout the specification, an aerosol generating device may include a device that uses an aerosol generating material to generate an aerosol that is directly inhaled into user's lungs through the user's mouth. For example, the aerosol generating device may include a holder.

In the specification, the term "puff" refers to inhalation of the user, and the inhalation may refer to a situation in which the user pulls the aerosol into the user's mouth, nasal cavity, or lungs through the user's mouth or nose.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

FIG. 1 is a diagram illustrating an aerosol generating system, according to an embodiment of the present disclosure. Referring to FIG. 1, the aerosol generating system may include an aerosol generating device 100 and a charging device 200. The aerosol generating device 100 may include an induction coil 130, a susceptor 110, a power supply 140, and a controller 150. The charging device 200 may include a transmission coil 220.

The aerosol generating device 100 may receive electric power from the charging device 200 through the induction coil 130 by using electromagnetic induction to charge the power supply 140. In addition, the aerosol generating device 100 may heat the susceptor 110 through the induction coil 130 by using electromagnetic induction to heat an aerosol generating material.

In the operation of charging the aerosol generating device 100 through the induction coil 130, the transmission coil 220 may operate as a transmission coil Tx that transmits electric power, and the induction coil 130 may operate as a reception coil Rx that receives the electric power transmitted by the transmission coil 220.

Reception and transmission of the electric power between the induction coil 130 and the transmission coil 220 may be performed in a wireless or non-contact way. The induction coil 130 and the transmission coil 220 may use a charging method using electromagnetic induction, or a magnetic field resonance method in which electric power is transferred at a resonance frequency of the transmission coil 220 and the reception coil. As for the details, a configuration commonly used in the art may be employed.

For example, according to the charging method using electromagnetic induction, the charging device 200 may control a current flowing through the transmission coil 220 to generate an alternating magnetic field. Eddy current may be induced to the induction coil 130 of the aerosol generating device 100 because of the alternating magnetic field generated by the transmission coil 220. The aerosol generating device 100 may supply electric power to the power supply 140 and charge the power supply 140 by using the eddy current flowing through the induction coil 130. In other words, the transmission coil 220 transmits electric power to the induction coil 130 by applying the magnetic field to the induction coil 130 such that the eddy current is induced in the induction coil 130.

The aerosol generating device 100 may further include a charger for supplying electric power to the power supply 140, and a regulator for controlling the voltage supplied to the charger.

In an operation of heating the aerosol generating device 100 through the induction coil 130, the controller 150 of the aerosol generating device 100 may control the current flowing through the induction coil 130 to generate a magnetic field, and an induced current may be generated in the susceptor 110 because of the magnetic field. The induction heating is a well-known phenomenon that can be explained by Faraday's Law of induction and Ohm's Law, and refers to a phenomenon that when magnetic induction in a conductor changes, a changing electric field is generated in the conductor.

As described above, if the electric field is generated in the conductor, the eddy current flows in the conductor according to Ohm's law, and the eddy current generates heat proportional to current density and conductor resistance. Heat generated from the susceptor 110 may be transferred to the aerosol generating material and vaporize the aerosol generating material to generate an aerosol.

In other words, when electric power is supplied to the induction coil 130, a magnetic field may be generated in the induction coil 130. When an alternating current is applied to the induction coil 130 by the power supply 140, the magnetic field generated in the induction coil 130 may periodically change its direction. When the susceptor 110 is exposed to the alternating magnetic field generated in the induction coil 130 that periodically changes a direction, the susceptor 110 may generate heat to heat a cigarette 300.

When an amplitude or frequency of the alternating magnetic field formed by the induction coil 130 changes, a temperature at which the susceptor 110 heats the cigarette 300 may also change. The controller 150 may control electric power supplied to the induction coil 130 to regulate the amplitude or frequency of the alternating magnetic field generated by the induction coil 130, and thus the temperature of the susceptor 110 may be controlled.

According to an embodiment, the induction coil 130 and the transmission coil 220 may be implemented as a solenoid. Material of a conductor constituting the solenoid may include copper (Cu). However, embodiments of the present disclosure are not limited thereto. The material of the conductor constituting the solenoid may include any one of silver (Ag), gold (Au), aluminum (Al), tungsten (W), zinc (Zn), and nickel (Ni) that have a low specific resistance value to allow a high current to flow, or an alloy including at least one thereof.

According to one or more embodiments of the present disclosure, the susceptor 110 may include a magnetic material. When an alternating magnetic field is applied to a magnetic material, energy may be lost from the magnetic material due to eddy current loss and hysteresis loss, and the lost energy may be released from the magnetic material as thermal energy. The greater the amplitude or frequency of the alternating magnetic field applied to the magnetic material is, the more thermal energy may be released from the magnetic material.

According to one or more embodiments of the present disclosure, the susceptor 110 may include a metal or carbon. The susceptor 110 may include at least one of ferrite, a ferromagnetic alloy, stainless steel, and aluminum. Alternatively, the susceptor 110 may include at least one of graphite, molybdenum, silicon carbide, niobium, a nickel alloy, a metal film, ceramic such as zirconia or the like, a transition metal such as nickel (Ni), cobalt (Co), or the like, and a metalloid such as boron (B) or phosphorus (P).

According to an embodiment, the susceptor 110 may be included in the aerosol generating material in the form of fragments, flakes, strips, or the like. According to another embodiment, the susceptor 110 may be arranged in the aerosol generating device 100. An embodiment in which the susceptor 110 is arranged in a cigarette insertion portion 120 will be described later in greater detail with reference to FIG. 5.

The power supply 140 of the aerosol generating device 100 may supply electric power needed for each component of the aerosol generating device 100 to operate. For example, the power supply 140 may supply electric power needed for the induction coil 130 to generate the magnetic field. Magnitude of the electric power supplied to the induction coil 130 may be regulated by a control signal generated by the controller 150.

The power supply 140 may be charged by the electric power received through the induction coil 130. The power supply 140 may include, for example, a nickel cadmium (Ni—Cd) rechargeable battery, an alkaline rechargeable battery, a nickel hydrogen (Ni—H) rechargeable battery, a sealed lead acid (SLA) rechargeable battery, a lithium ion (Li-ion) rechargeable battery, a lithium polymer (Li-polymer) rechargeable battery, and the like.

According to one or more embodiments of the present disclosure, the power supply 140 may include a battery for supplying a direct current and a converter for converting the direct current supplied by the battery into an alternating current supplied to the induction coil 130, or for converting an alternating current received through the transmission coil 220 into the direct current.

According to one or more embodiments, the power supply 140 may include a regulator that is disposed between the battery and the controller 150 to maintain a voltage of the battery constant.

The controller 150 of the aerosol generating device 100 may generate and transmit a control signal to control the overall components such as the induction coil 130, the power supply 140, the susceptor 110, and the like included within the aerosol generating device 100. For example, the controller 150 may use electric power from the power supply 140 to apply current to the induction coil 130, or may use the electric power received through the induction coil 130 to charge the power supply 140.

The controller 150 may operate a heating mode for heating the susceptor 110 and a charging mode for charging the power supply 140. The heating mode and the charging mode may be selectively operated. The heating mode and the charging mode will be described later in greater detail with reference to FIG. 4.

The controller 150 may be implemented with an array of multiple logic gates, or may be implemented with a combination of a memory in which a general-purpose microprocessor and a program capable of being executed in the microprocessor are stored. Alternatively, the controller 150 may include a plurality of processing elements.

Although not shown, the controller 150 may further include an input receiver for receiving a user's button input or touch input, a communication unit capable of communicating with an external communication device such as a user terminal, a display for displaying information on the state of the aerosol generating device 100, and a pulse width modulation processer for controlling pulse width of the electric power applied to the induction coil 130.

A controller 260 of the charging device 200 may control the overall operation of components such the transmission coil 220, a power supply 280, and the like. For example, the controller 260 may transform an external power source into an appropriate form to apply an alternating current to the transmission coil 220. In addition, the controller 260 may store the external power source in the power supply 280, and may apply current from the power supply 280 to the transmission coil 220, if necessary.

The controller 260 may be implemented with various numbers of hardware and/or software configurations that execute functions. Alternatively, the controller 260 may be implemented by microprocessors, or by circuit configurations for a certain function. For example, the controller 260 may be implemented in various programming or scripting languages.

The power supply 280 of the charging device 200 may supply electric power to the transmission coil 220, if necessary. According to an embodiment, the power supply 280 may include a battery for storing electric power to be transmitted to the aerosol generating device 100. According to another embodiment, the power supply 280 may receive electric power from the external power source such as an outlet and supply the electric power to the transmission coil 220. In that case, the power supply 280 may include electronic devices such as a converter, an adapter, and a rectifier to receive electric power from the external power source such as the outlet and supply the electric power to the transmission coil 220 in an appropriate form.

The power supply 280 may further include a power receiver (not shown) that receives electric power from an external power source (not shown). The power receiver may receive electric power in a wireless charging method or a wired charging method. In the case of the wireless charging method, the power receiver may be in the form of a coil. In the case of the wired charging method, the power receiver may be combined with the external power source. The power supply may receive electric power from the external power source through the power receiver and charge a battery. An operation of charging the power supply 280 of the charging device 200 will be described later in greater detail with reference to FIG. 18.

According to an embodiment, the charging device 200 may be in the form of a cradle to which the aerosol generating device 100 may be coupled. When the aerosol generating device 100 is mounted on the cradle, electrodes of the aerosol generating device 100 and electrodes of the cradle are connected to each other, and electric power may be supplied to the power supply 140 of the aerosol generating device 100 through the power supply 280.

When the charging device 200 is in the form of a cradle, a cavity in which the aerosol generating device 100 is accommodated may be formed in the charging device 200. Coupling of the charging device 200 and the aerosol generating device 100 will be described later in greater detail with reference to FIGS. 13 to 17.

According to another embodiment, the charging device 200 may be a portable device that is not restricted by the location of the external power source. The power supply 280 may include a battery built into the charging device 200. The power supply 280 may include a rechargeable battery.

Although not shown, the charging device 200 may include an input unit for receiving an input related to operations such as on-off, setting of charging intensity, and the like from the user, and an LED or a display for displaying information on remaining capacity of the battery, charging intensity, and the like of the charging device 200.

Although not shown, the aerosol generating system may further include an external power source for supplying electric power to the charging device 200. The external power source may supply electric power to the charging device 200 in a wireless charging method or a wired charging method.

The external power source may include an external power transmitter for transmitting electric power. In the case of the wireless charging method, the external power transmitter may be in the form of a coil. In the case of the wired charging method, the external power transmitter may be combined with the charging device 200. The power supply 280 may receive electric power from the external power source through a power receiver and charge the battery. The external power source will be described later in greater detail with reference to FIG. 18.

Figure 2:
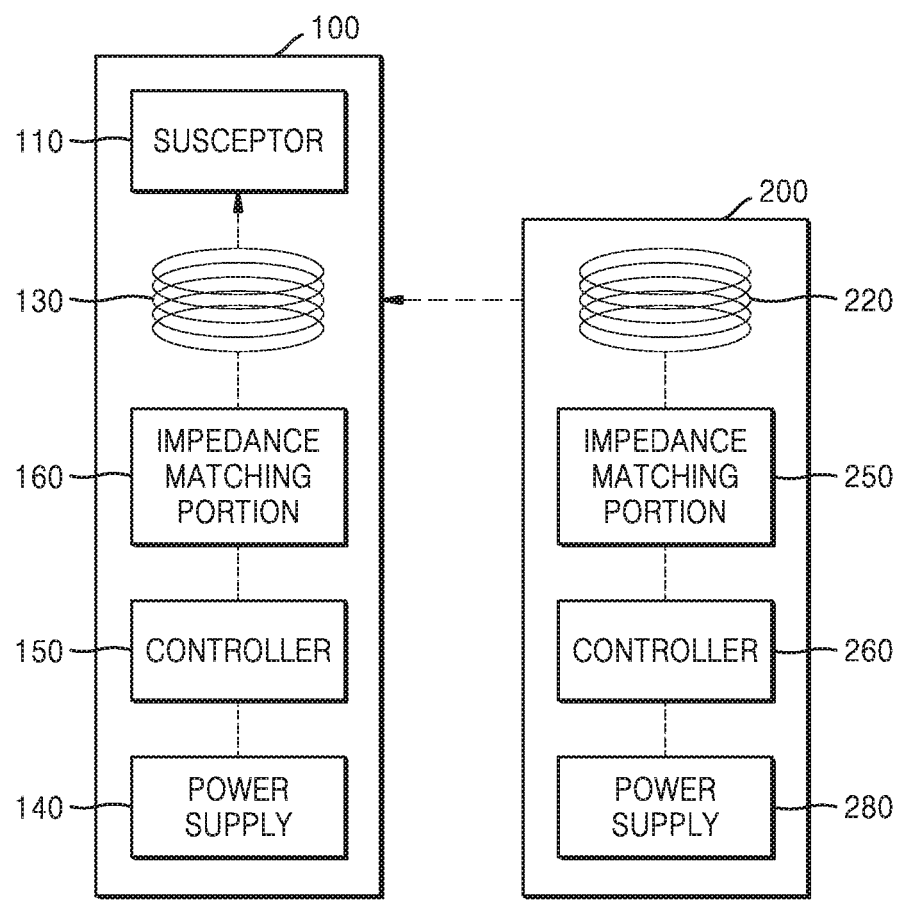
FIGS. 2 and 3 are diagrams illustrating an aerosol generating device, according to an embodiment.
Figure 3:
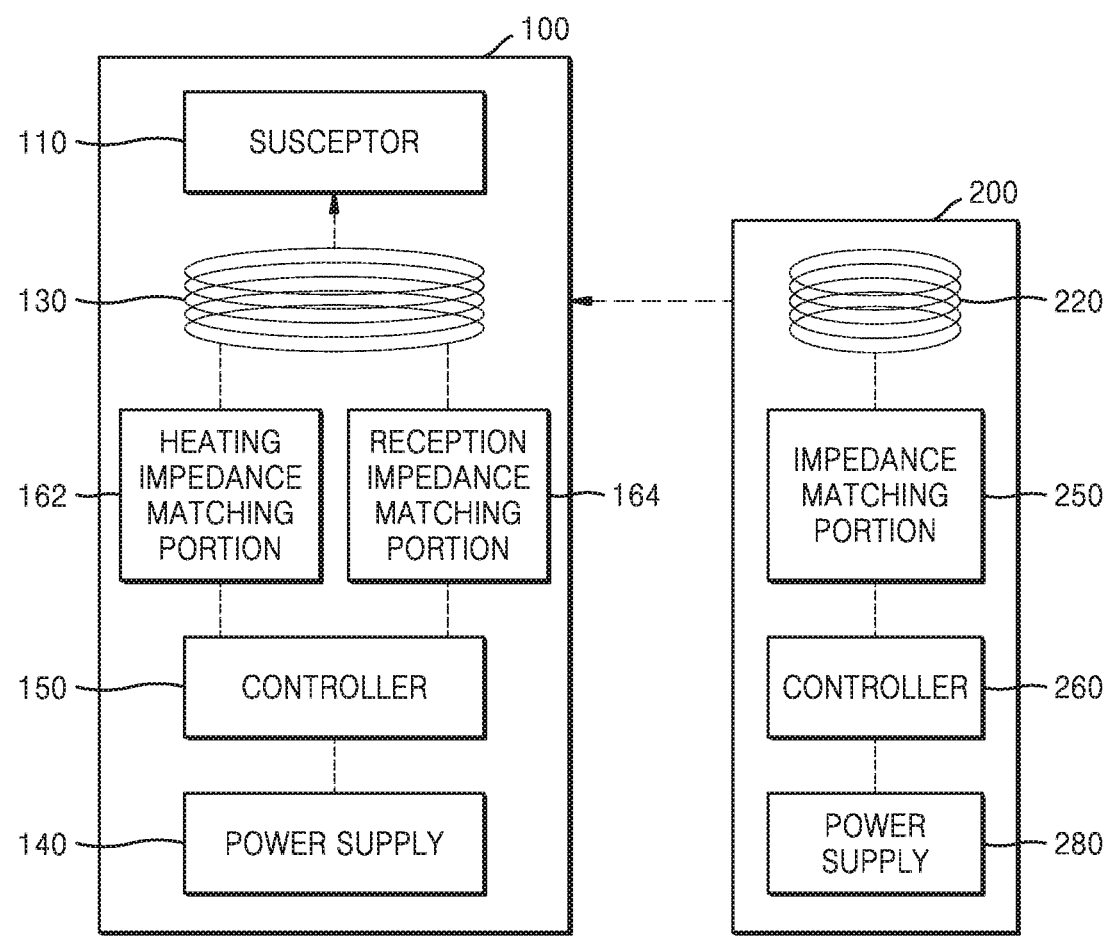

FIGS. 2 and 3 are diagrams illustrating an aerosol generating device, according to another embodiment. Referring to FIG. 2, the aerosol generating device 100 may include an impedance matching portion 160 for receiving electric power from the transmission coil 220 through the induction coil 130, or for transmitting electric power to the induction coil 130 for the susceptor 110 to be heated. In other words, the impedance matching portion 160 may be a power receiver and also a power transmitter. One end of the impedance matching portion 160 may be connected to the induction coil 130, and the other end of the impedance matching portion 160 may be connected to the controller 150 or to the power supply 140.

The impedance matching portion 160 may include a variety of electronic devices including resistors, coils, capacitors, and the like. Alternatively, the impedance matching portion 160 may include a conductor including a quarter-wave transformer or a stub.

An impedance value of the impedance matching portion 160 may be appropriately set such that a charging operation for receiving electric power from the transmission coil 220 and a heating operation for transmitting electric power to the susceptor 110 are efficiently performed.

In particular, the impedance value of the impedance matching portion 160 may be set such that the susceptor 110 is prevented from being heated by the electric power transmitted by the transmission coil 220 during the charging operation.

More specifically, the charging device 200 may include an impedance matching portion 250. An impedance value of the impedance matching portion 250 and the impedance value of the impedance matching portion 160 may be set such that transmission and reception of electric power between the impedance matching portion 250 and the impedance matching portion 160 may be efficiently performed.

The susceptor 110 has its own impedance value. Here, the impedance value of the susceptor 110 refers to an impedance value that is determined by the susceptor 110 and electronic devices connected to the susceptor 110 to perform the heating operation.

If the impedance value of the impedance matching portion 250 of the charging device 200 and the impedance value of the susceptor 110 are similar to each other, electric power transmitted by the charging device 200 may also be transmitted to the susceptor 110. As a result, the charging operation and the heating operation may occur simultaneously. In order to prevent such a case, the impedance value of the impedance matching portion 250 and the impedance value of the susceptor 110 are adopted to be different from each other.

The more the impedance value of the impedance matching portion 160 and the impedance value of the impedance matching portion 250 are similar to each other, the higher efficiency of power transfer between the impedance matching portion 160 and the impedance matching portion 250 may be achieved. On the other hand, the more the impedance value of the impedance matching portion 160 and the impedance value of the susceptor 110 are similar to each other, the higher electromagnetic induction efficiency and heating efficiency may be achieved.

The impedance value of the impedance matching portion 160 may be between the impedance value of the impedance matching portion 250 and the impedance value of the susceptor 110 such that electric power transfer between the impedance matching portion 250 and the susceptor 110 is prevented while achieving satisfactory power transfer efficiency with respect to the impedance matching portion 250 and electromagnetic induction efficiency with respect to the susceptor 110. In other words, the impedance value of the impedance matching portion 160 may be a value between the impedance value of the susceptor 110 and an impedance value of the charging device 200.

Referring to FIG. 3, the aerosol generating device 100 may be provided with a heating impedance matching portion 162 for applying a magnetic field to the susceptor 110, and a reception impedance matching portion 164 for receiving electric power from the transmission coil 220. A first impedance value of the heating impedance matching portion 162 and a second impedance value of the reception impedance matching portion 164 may be different from each other.

The first impedance value of the heating impedance matching portion 162 may be similar or equal to the impedance value of the susceptor 110. Thus, the transmission and reception of electric power between the induction coil 130 and the susceptor 110, and the corresponding heating operation may be efficiently performed through the heating impedance matching portion 162.

The second impedance value of the reception impedance matching portion 164 may be similar or equal to the impedance value of the impedance matching portion 250 within the charging device 200. Therefore, the transmission and reception of electric power between the induction coil 130 and the transmission coil 220, and the corresponding charging operation may be efficiently performed through the reception impedance matching portion 164.

Depending on the configuration and arrangement of RLC elements constituting each of the heating impedance matching portion 162 and the reception impedance matching portion 164, or a value of the conductor such as the stub, the heating impedance matching portion 162 and the reception impedance matching portion 164 may have impedance values different from each other.

The aerosol generating device 100 may include a switch (not shown) capable of selectively choosing an impedance matching portion connected to the induction coil 130. The aerosol generating device 100 may operate the switch to selectively connect any one of the heating impedance matching portion 162 and the reception impedance matching portion 164 to the induction coil 130, and the heating impedance matching portion 162 or the reception impedance matching portion 164 that is not connected to the induction coil 130 may be electrically disconnected from the induction coil 130.

Thus, an impedance value of the impedance matching portion connected to the induction coil 130 may be adjusted to a different value. Accordingly, the aerosol generating device 100 may selectively perform the heating operation and the charging operation according to the operation of the switch.

Since the first impedance value of the susceptor 110 and the second impedance value of the impedance matching portion 250 within the charging device 200 are different from each other, the susceptor 110 may be prevented from being heated by the charging device 200.

For example, the switch may include a field-effect transistor (FET). The switch may also include a P channel FET or an N channel FET. As another example, the switch may include a bipolar junction transistor (BJT), an insulated gate bipolar transistor (IGBT), or a thyristor. However, embodiments of the present disclosure are not limited thereto. The switch may be a single electronic element, or a circuit including multiple electronic elements.

Figure 4:
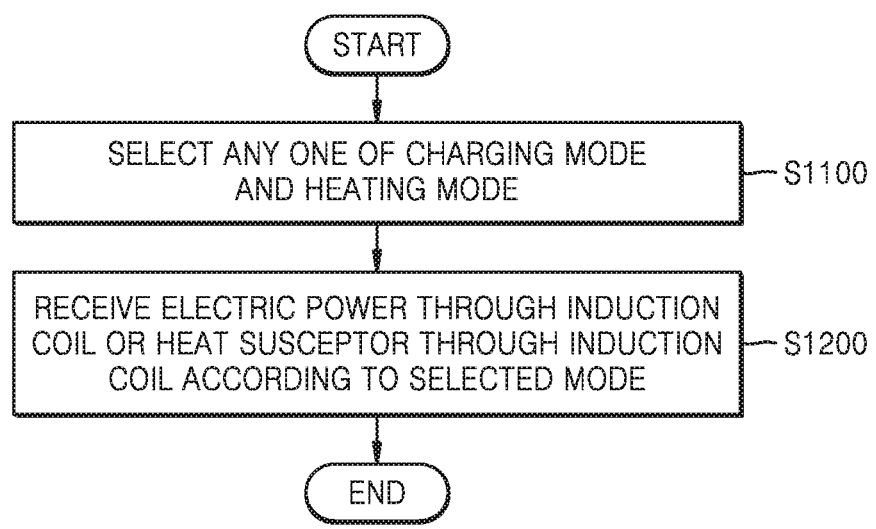
FIG. 4 is a flowchart of a method of operation of an aerosol generating device, according to an embodiment.

FIG. 4 is a flowchart of a method of operation of an aerosol generating device, according to an embodiment. Referring to FIG. 4, the aerosol generating device 100 may select any one of a charging mode and a heating mode, in S1100.

The charging mode is a mode in which electric power is supplied by the charging device 200 through the induction coil 130 to charge electric power of the power supply 140, and the heating mode is a mode in which the susceptor 110 is heated through the induction coil 130 to vaporize an aerosol generating material.

Descriptions given with reference to FIGS. 1 to 3 may apply to the charging mode and the heating mode. Descriptions to be given later with reference to FIGS. 5 to 12 may also apply to the charging mode and the heating mode.

Each mode may include an algorithm, code, or a program for the aerosol generating device 100 to execute a specific function, and a mode may be operated by executing the algorithm, code, program, and the like.

The charging mode and the heating mode are merely examples of modes that the aerosol generating device 100 may select and operate, and the operation modes of the aerosol generating device 100 are not limited thereto.

According to an embodiment, the aerosol generating device 100 may select a mode that operates according to a user input received through an input unit. The aerosol generating device 100 may select the heating mode when receiving the user input for heating the cigarette 300 to smoke. The aerosol generating device 100 may also select the charging mode when receiving the user input for charging the power supply 140.

In addition, the aerosol generating device 100 may select an operation mode according to a signal detected by a sensor. For example, the sensor may detect whether the cigarette 300 is inserted into the cigarette insertion portion 120 or not. The sensor may include a proximity sensor arranged in the cigarette insertion portion 120, a touch sensor, a limit switch, a sensor for detecting a change in capacitance, an optical sensor, and the like.

The sensor may also detect whether the aerosol generating device 100 and the charging device 200 are coupled to each other or not. In that case, the sensor may include a proximity sensor arranged at a coupling portion between the aerosol generating device 100 and the charging device 200, a touch sensor, a limit switch, a sensor for detecting a change in capacitance, an optical sensor, an energizing sensor for detecting connection of electrodes, and the like.

The aerosol generating device 100 may receive electric power through the induction coil 130 or heat the susceptor 110 through the induction coil 130 according to a selected mode, in S1200.

The descriptions given with reference to FIGS. 1 to 3 and descriptions to be given later with reference to FIGS. 5 to 12 may apply to the aerosol generating device 100 performing the charging operation and the heating operation.

To perform the selected mode, the aerosol generating device 100 may restrict operation of the mode that is not selected. For example, as described above with reference to FIG. 3, the aerosol generating device 100 may operate a switch to connect the induction coil 130 to only one of the heating impedance matching portion 162 and the reception impedance matching portion 164.

Figure 5:
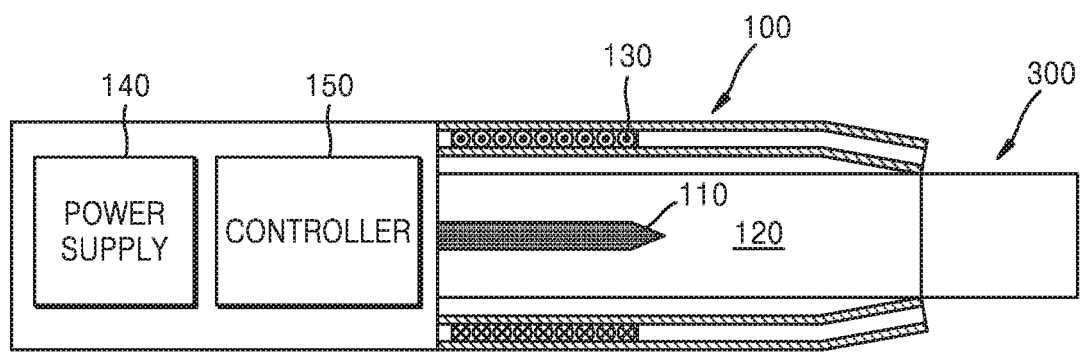
FIG. 5 is a diagram illustrating an aerosol generating device into which a cigarette is inserted, according to an embodiment.

FIG. 5 is a diagram illustrating the aerosol generating device 100 into which a cigarette is inserted. Referring to FIG. 5, the aerosol generating device 100 may include the cigarette insertion portion 120 into which the cigarette 300 including an aerosol generating material may be inserted. The susceptor 110 may be arranged in the cigarette insertion portion 120.

When the cigarette 300 is inserted into the aerosol generating device 100, the cigarette 300 may contact the susceptor 110 or be arranged proximate to the susceptor 110. The aerosol generating device 100 may heat the susceptor 110 through the induction coil 130, and heat from the susceptor 110 may be transferred to the cigarette 300 to generate an aerosol. The aerosol passes through the cigarette 300 to be delivered to a user.

The susceptor 110 may be arranged on a bottom surface formed at an inner end portion of the cigarette insertion portion 120. The susceptor 110 may be in a rod shape protruding from a bottom surface of an empty space. The cigarette 300 may be inserted into the susceptor 110 from an upper end portion of the susceptor 110, and accommodated to the bottom surface of the cigarette insertion portion 120.

The induction coil 130 may be wound along a side surface of the cigarette insertion portion 120 and arranged at a position corresponding to the susceptor 110. The induction coil 130 may be supplied with electric power by the power supply 140.

As the susceptor 110 is provided in the aerosol generating device 100, there may be various advantages compared to the case where the susceptor 110 is provided in the cigarette 300. For example, when the susceptor 110 material is not uniformly distributed inside the cigarette 300, the aerosol and flavor are generated non-uniformly. This problem may be solved if the susceptor 110 is provided in the aerosol generating device 100. In addition, since the aerosol generating device 100 is provided with the susceptor 110, a temperature of the susceptor 110 that generates heat through induction heating may be directly measured and provided to the aerosol generating device 100. Accordingly, the temperature of the susceptor 110 may be precisely controlled.

The cigarette insertion portion 120 may be located at a proximal end of the aerosol generating device 100 facing the user when smoking. The cigarette insertion portion 120 may include an empty space that extends toward a distal end from the proximal end of the aerosol generating device 100. The cigarette insertion portion 120 may include an opening that opens to the outside of the cigarette insertion portion 120. The cigarette 300 may be inserted into the empty space through the opening of the cigarette insertion portion 120. The empty space may include a hollow.

According to one or more embodiments of the present disclosure, the cigarette insertion portion 120 may be the proximal end of the aerosol generating device 100 including the empty space, or may be the empty space itself formed at the proximal end of the aerosol generating device 100.

The empty space of the cigarette insertion portion 120 may include a cross section that corresponds to a shape of the cigarette 300. For example, the cross section of the empty space of the cigarette insertion portion 120 may be in a circular shape. A diameter of the empty space of the cigarette insertion portion 120 may have a value similar to a diameter of the cigarette 300.

According to one or more embodiments, a vaporizer including a liquid storage, a liquid delivery means, and a heating element may be included in the aerosol generating device 100 as an independent module.

The liquid storage may store a liquid composition. For example, the liquid composition may include a liquid containing a tobacco-containing substance containing a volatile tobacco flavor ingredient, or a liquid containing a non-tobacco substance. The liquid storage may be manufactured to be detachably attached to a vaporizer, or may be manufactured to be integral with the vaporizer.

For example, the vaporizer may be referred to as a cartomizer or atomizer. However, embodiments of the present disclosure are not limited thereto.

A portion of the cigarette 300 may be inserted into the aerosol generating device 100, and the rest portions may be exposed to the outside. The user may inhale the aerosol by biting a portion exposed to the outside. The aerosol is generated as air from the outside passes through an end portion of the cigarette 300 inserted into the aerosol generating device 100, and the generated aerosol passes through the other end portion of the cigarette 300 to be delivered to the user.

For example, the external air may flow into at least one air passage formed in the aerosol generating device 100. For example, opening and closing of the air passage and/or a size of the air passage may be adjusted by the user. Accordingly, the amount and quality of the aerosol may be adjusted by the user. As another example, the external air may flow into the cigarette 300 through at least one hole formed in a surface of the cigarette 300.

Figure 6:
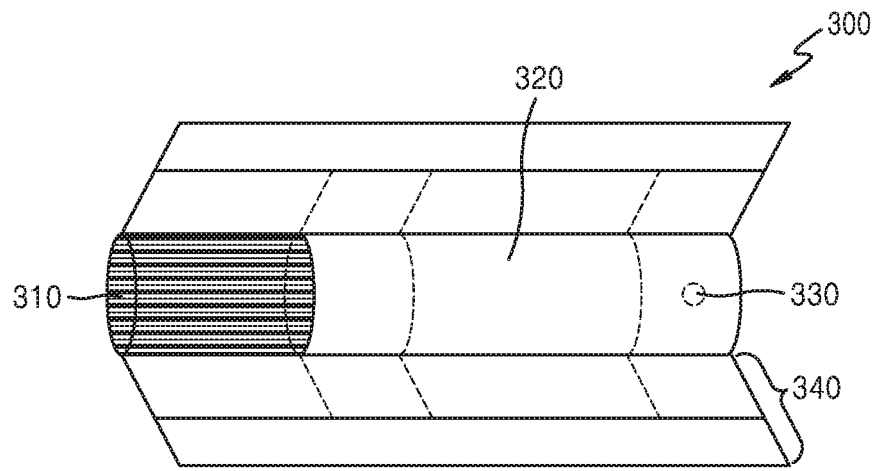
FIG. 6 is a view showing an example of the cigarette.

FIG. 6 shows a view showing an example of a cigarette. Referring to FIG. 6, the cigarette 300 includes a tobacco rod 310 and a filter rod 320. The filter rod 320 illustrated in FIG. 6 is illustrated as a single segment, but is not limited thereto, and the filter rod 320 may include a plurality of segments. For example, the filter rod 320 may include a first segment configured to cool an aerosol and a second segment configured to filter a certain component included in the aerosol. Also, the filter rod 320 may further include at least one segment configured to perform other functions.

The cigarette 300 may be packaged by at least one wrapper 340. The wrapper 340 may have at least one hole through which external air may be introduced or internal air may be discharged. For example, the cigarette 300 may be packaged by one wrapper 340. As another example, the cigarette 300 may be double-packaged by at least two wrappers 340. More specifically, the tobacco rod 310 may be packaged by a first wrapper, and the filter rod 320 may be packaged by a second wrapper. The tobacco rod 310 and the filter rod 320, which are respectively packaged by wrappers, may be coupled to each other, and the entire cigarette 300 may be packaged by a third wrapper.

The tobacco rod 310 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. the tobacco rod 310 may include other additives, such as flavors, a wetting agent, and/or organic acid. Also, the tobacco rod 310 may include a flavored liquid, such as menthol or a moisturizer, which is injected to the tobacco rod 310.

The tobacco rod 310 may be manufactured in various forms. For example, the tobacco rod 310 may be formed using a sheet or strands. Also, the tobacco rod 310 may be formed as a pipe tobacco, which is formed of tiny bits cut from a tobacco sheet.

Also, the tobacco rod 310 may be surrounded by a heat conductive material. For example, the heat-conducting material may be, but is not limited to, a metal foil such as aluminum foil. The heat conductive material surrounding the tobacco rod 310 may uniformly distribute heat transmitted to the tobacco rod 310. As such, the heat conductivity of the tobacco rod may be increased, and flavors of aerosol generated from the tobacco rod 310 may be improved.

The filter rod 320 may include a cellulose acetate filter. A shape of the filter rod 320 is not limited. For example, the filter rod 320 may include a cylinder-type rod or a tube-type rod having a hollow inside. Also, the filter rod 320 may include a recess-type rod including a cavity therein. When the filter rod 320 includes a plurality of segments, the plurality of segments may have a different shape each other.

The filter rod 320 may be formed to generate flavors. For example, a flavoring liquid may be injected onto the filter rod 320, or an additional fiber coated with a flavoring liquid may be inserted into the filter rod 320.

The filter rod 320 may include at least one capsule 330. The capsule 330 may generate a flavor or an aerosol. For example, the capsule 330 may have a configuration in which a liquid containing a flavoring material is wrapped with a film. For example, the capsule 330 may have a spherical or cylindrical shape, but is not limited thereto.

Although not shown, the cigarette 300 may further include a front end plug. The front end plug may be located on one side of a tobacco rod 310 opposite the filter rod 320. The front end plug may prevent the tobacco rod 310 from falling out of the cigarette 300, and may also prevent the liquefied aerosol from leaking into the aerosol generating device 100 from the tobacco rod 310 during smoking.

Figure 7:
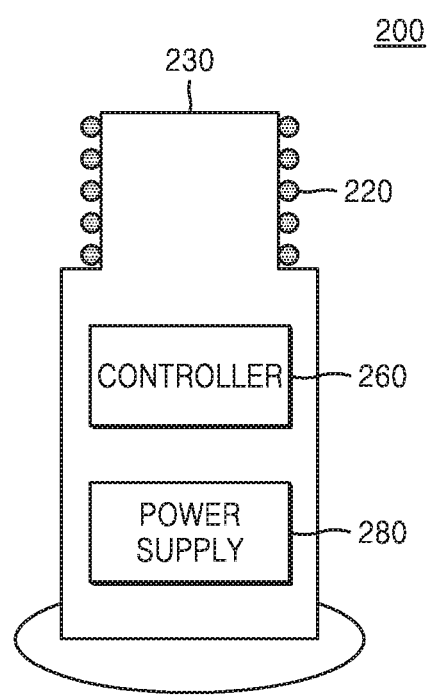
FIG. 7 is a diagram illustrating a charging device, according to an embodiment.

FIG. 7 is a diagram illustrating a charging device, according to an embodiment. Referring to FIG. 7, the charging device 200 may further include a protrusion portion 230 around which the transmission coil 220 is wound.

The protrusion portion 230 may protrude outward from one end of the charging device 200 in one direction. The protrusion portion 230 may provide a space around which the transmission coil 220 is wound. The transmission coil 220 may be wound along a circumference of the protrusion portion 230. The transmission coil 220 may be wound around an outer surface of the protrusion portion 230. Alternatively, when the protrusion portion 230 includes an empty space 290, as illustrated later herein (for example, in FIG. 8), the transmission coil 220 may be wound along an inner surface of the empty space 290.

The protrusion portion 230 may protrude by a certain length so that the transmission coil 220 has a certain number of windings extending by a certain distance. The greater the number of windings is, the greater magnitude of electromotive force is induced in the induction coil 130.

According to an embodiment, the protrusion portion 230 may include a metal object or a magnetic object having a certain magnetic permeability to amplify the effect of electromagnetic induction. Accordingly, the transmission coil 220 may be in the form of a solenoid including a metal object or a magnetic object therein.

The charging device 200 may be coupled to the aerosol generating device 100 to charge the aerosol generating device 100. In that case, the charging device 200 may be arranged such that the protrusion portion 230 faces the cigarette insertion portion 120.

According to one or more embodiments, the transmission coil 220 may be inserted into the induction coil 130. Alternatively, the induction coil 130 may be inserted into the transmission coil 220. The induction coil 130 and the transmission coil 220 may be separated by a certain distance from each other in an axial direction. According to one or more embodiments in which the charging device 200 and the aerosol generating device 100 are coupled to each other, a length and diameter of the protrusion portion 230 may be different.

Hereinafter, embodiments in which the charging device 200 and the aerosol generating device 100 are coupled to each other will be described with reference to FIGS. 8 to 12. Embodiments show in common that when the charging device 200 and the aerosol generating device 100 are coupled to each other, a central axis of the induction coil 130 and a central axis of the transmission coil 220 may be in parallel with each other. The central axis of the induction coil 130 and the central axis of the transmission coil 220 may be aligned to be located on the same line. Thus, the induction coil 130 may efficiently receive electric power transmitted by the transmission coil 220, and power loss may be minimized, accordingly.

Figure 8:
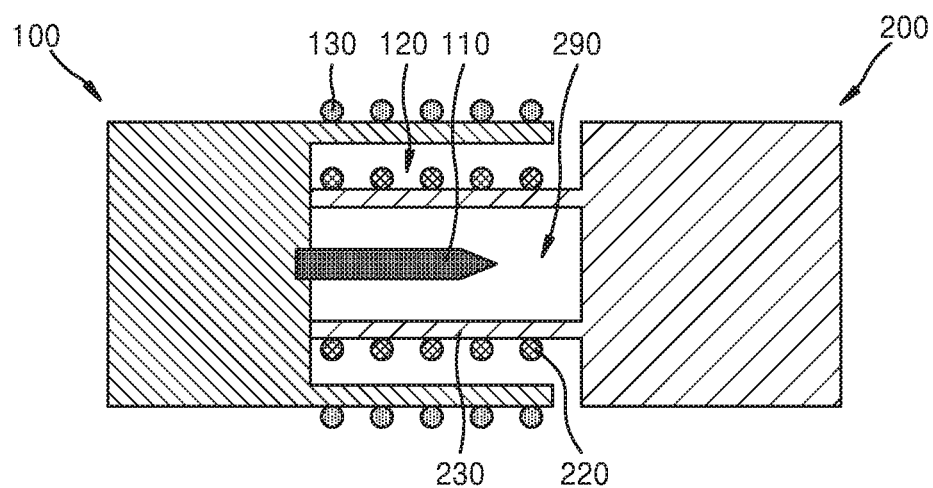
FIG. 8 is a diagram illustrating a state in which an aerosol generating device and a charging device are coupled to each other for a charging operation, according to an embodiment.

FIG. 8 is a diagram illustrating a state in which an aerosol generating device and a charging device are coupled to each other for a charging operation, according to an embodiment. Referring to FIG. 8, the protrusion portion 230 of the charging device 200 may be inserted into the cigarette insertion portion 120 of the aerosol generating device 100 to be coupled thereto.

In that case, the transmission coil 220 may be located inside the induction coil 130. A diameter of the induction coil 130 may be greater than a diameter of the transmission coil 220, and the induction coil 130 may surround the transmission coil 220.

A length in an axial direction of the induction coil 130 and a length in an axial direction of the transmission coil 220 may be similar or equal to each other. When the protrusion portion 230 is inserted into the cigarette insertion portion 120, the induction coil 130 and the transmission coil 220 may overlap partially or completely when viewed from a side. The greater the overlapping portions are, the more efficiently the induction coil 130 receives electric power transmitted by the transmission coil 220.

The empty space 290 extending in an axial direction may be formed in the protrusion portion 230. The empty space 290 may be a hollow. When the protrusion portion 230 is inserted into the cigarette insertion portion 120, the susceptor 110 may be inserted into the empty space 290 to be accommodated therein. In that case, the protrusion portion 230 may be inserted into an empty space of the cigarette insertion portion 120.

A length in an axial direction of the empty space 290 may be greater than or equal to a length of the susceptor 110 such that the susceptor 110 is mounted on a bottom surface. A diameter of the empty space 290 may be greater than or equal to a diameter of the susceptor 110. Since residual substances of a cigarette may remain on the susceptor 110 after smoking, the diameter of the empty space 290 may be greater than the diameter of the susceptor 110 by a certain difference value, accordingly.

Figure 9:
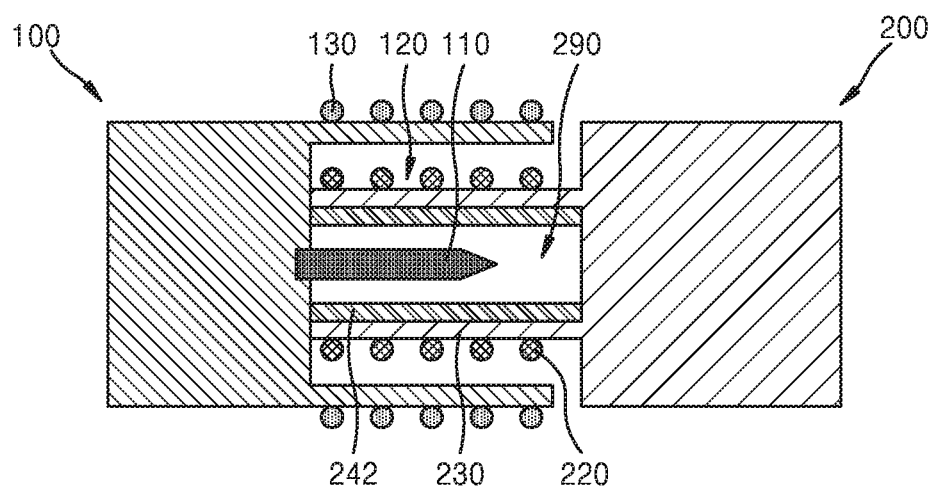
FIG. 9 is a diagram illustrating a shield member formed in a charging device coupled in the manner according to FIG. 8.

FIG. 9 is a diagram illustrating a shield member formed in a charging device coupled in the manner according to FIG. 8. Referring to FIG. 9, a shield member 242 may be arranged on an inner surface of the empty space 290 along a circumference of the empty space 290. When the protrusion portion 230 is inserted into the cigarette insertion portion 120, the susceptor 110 may be inserted into the shield member 242 to be accommodated therein. In that case, the shield member 242 may prevent a magnetic field generated from the transmission coil 220 from being transferred into the empty space 290. Accordingly, the magnetic field generated from the transmission coil 220 may be prevented from affecting the susceptor 110. As such, the susceptor 110 may be prevented from being heated.

The shield member 242 may include, for example, a conductor such as aluminum and copper. Alternatively, the shield member 242 may include a carbon material such as carbon fiber, carbon nanotube (CNT), carbon black, graphene, and the like. Alternatively, the shield member 242 may include a polymer composite material or a combination of the polymer composite material and carbon, ceramic, a metal, or the like.

The shield member 242 may be, for example, in the form of a sheet metal, mesh, or ionized gas. The shield member 242 may be attached to an inner surface of the empty space 290 by, for example, sputtering, plating, or spray coating.

Figure 10:
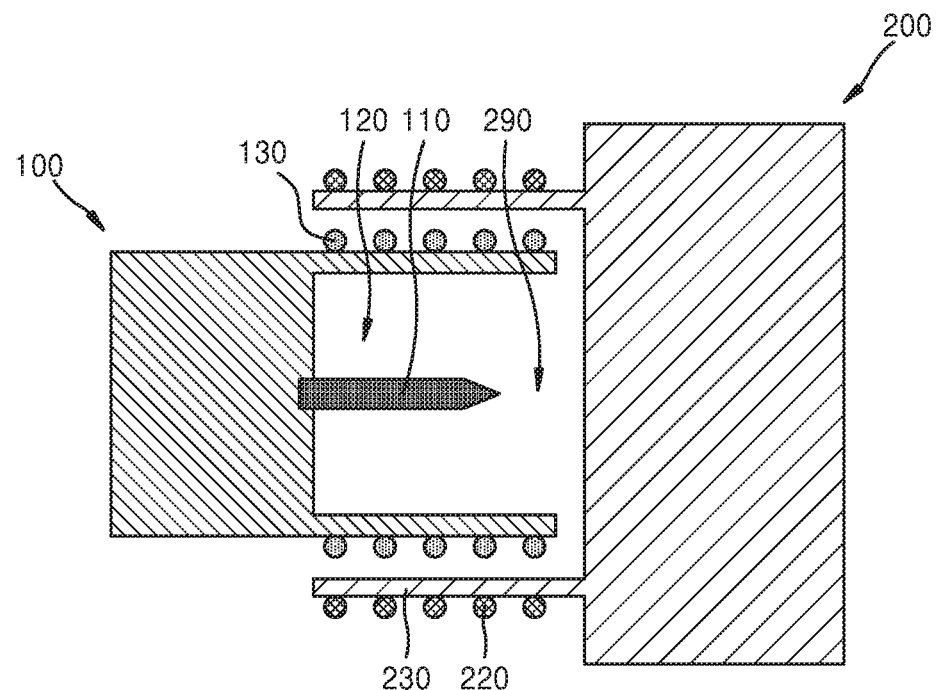
FIG. 10 is a diagram illustrating a state in which an aerosol generating device and a charging device are coupled to each other for a charging operation, according to another embodiment.

FIG. 10 is a diagram illustrating a state in which an aerosol generating device and a charging device are coupled to each other for a charging operation, according to another embodiment. Referring to FIG. 10, the cigarette insertion portion 120 of the aerosol generating device 100 may be inserted into the empty space 290 formed in the protrusion portion 230 of the charging device 200 to be coupled thereto. A diameter of the empty space 290 may be greater than or equal to a diameter of the cigarette insertion portion 120.

In that case, the induction coil 130 may be located inside the transmission coil 220. A diameter of the transmission coil 220 may be greater than a diameter of the induction coil 130, and the transmission coil 220 may surround the induction coil 130. A length in an axial direction of the transmission coil 220 and a length in an axial direction of the induction coil 130 may be similar or equal to each other. Thus, electric power may be efficiently transmitted from the transmission coil 220 to the induction coil 130.

Residual substances of a cigarette may remain on the susceptor 110 after smoking. If the cigarette insertion portion 120 is inserted into the protrusion portion 230 as illustrated in FIG. 10, a possibility of contamination of the charging device 200 due to the residual substances of a cigarette attached to the susceptor 110 may be reduced.

Figure 11:
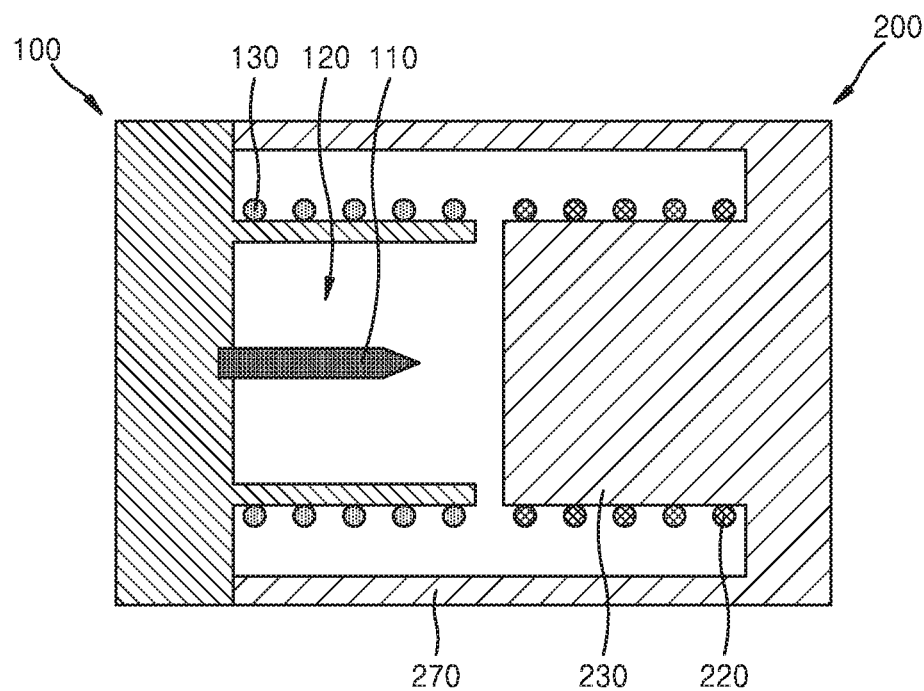
FIG. 11 is a diagram illustrating a state in which an aerosol generating device and a charging device are coupled to each other for a charging operation, according to another embodiment.

FIG. 11 is a diagram illustrating a state in which an aerosol generating device and a charging device are coupled to each other for a charging operation, according to another embodiment. Referring to FIG. 11, while the aerosol generating device 100 and the charging device 200 may be coupled to each other for a charging operation, the cigarette insertion portion 120 and the protrusion portion 230 may be aligned side by side in an axial direction, separated by a certain distance from each other in the axial direction. Accordingly, the induction coil 130 and the transmission coil 220 may be separated by a certain distance from each other in an axial direction. Thus, a possibility of contamination of the charging device 200 due to residual substances of a cigarette remaining in the cigarette insertion portion 120 may be reduced.

The charging device 200 may include a support 270 to secure a certain distance between the protrusion portion 230 and the cigarette insertion portion 120. When the aerosol generating device 100 and the charging device 200 are coupled to each other, the support 270 may support the cigarette insertion portion 120 to prevent the cigarette insertion portion 120 and the protrusion portion 230 from being disposed within a certain distance from each other. A length of the support 170 may be the sum of a length of the protrusion portion 230, a length of the cigarette insertion portion 120, and the certain distance.

Although not shown, according to another embodiment, the aerosol generating device 100 may include the support 270 that supports the protrusion portion 230 to secure a certain distance between the protrusion portion 230 and the cigarette insertion portion 120.

A diameter of the cigarette insertion portion 120 and a diameter of the protrusion portion 230 may be similar or equal to each other. Accordingly, a diameter of the induction coil 130 and a diameter of the transmission coil 220 may be similar or equal to each other. The more equal the diameter of the induction coil 130 and the diameter of the transmission coil 220 aligned side by side in an axial direction, the more efficiently the induction coil 130 receives electric power transmitted by the transmission coil 220.

Figure 12:
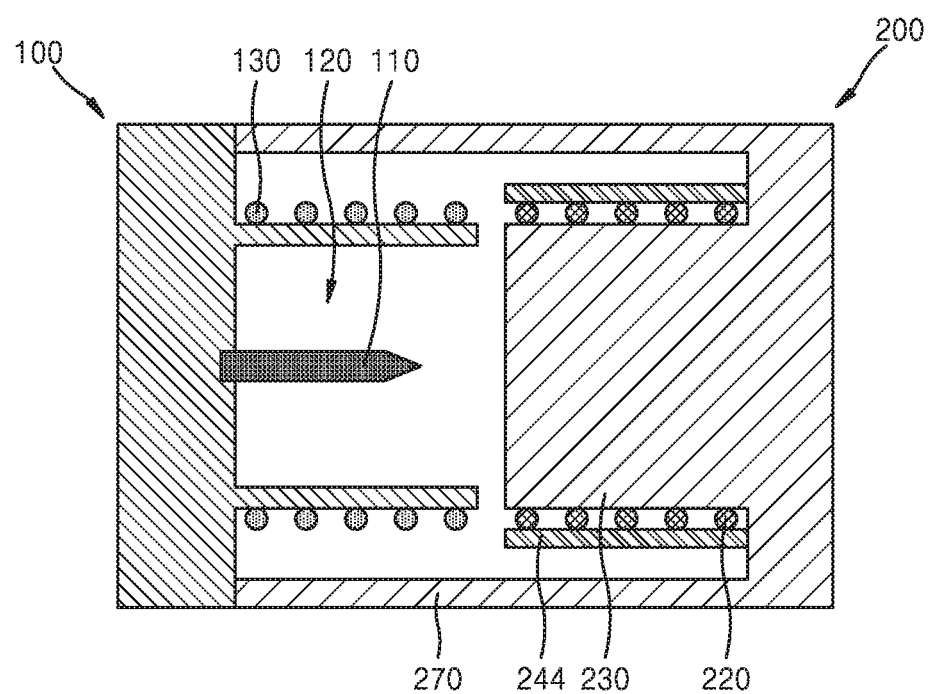
FIG. 12 a diagram illustrating a shield member formed in a charging device coupled in the manner according to FIG. 11.

FIG. 12 is a diagram illustrating a shield member formed in a charging device coupled to the aerosol generating device in the manner according to FIG. 11. Referring to FIG. 12, the charging device 200 may include a shield member 244 that surrounds the transmission coil 220. The shield member 244 may be in a cylindrical shape that surrounds the transmission coil 220.

Thus, the shield member 244 may prevent electric power from being radiated in a radial direction of the transmission coil 220, and may increase directivity of electric power such that the electric power is transmitted in an axial direction of the induction coil 130. As a result, the induction coil 130 may efficiently receive electric power transmitted by the transmission coil 220.

The shield member 244 may include, for example, a conductor such as aluminum and copper. Alternatively, the shield member 244 may include a carbon material such as carbon fiber, carbon nanotube (CNT), carbon black, graphene, and the like. Alternatively, the shield member 244 may be made of a polymer composite material or a combination of a polymer composite material and carbon, ceramic, a metal, or the like.

In addition, the shield member 244 may be, for example, in the form of a sheet metal, mesh, or ionized gas. The shield member 244 may be applied to a shield structure surrounding the transmission coil 220 by sputtering, plating, or spray coating.

Figure 13:
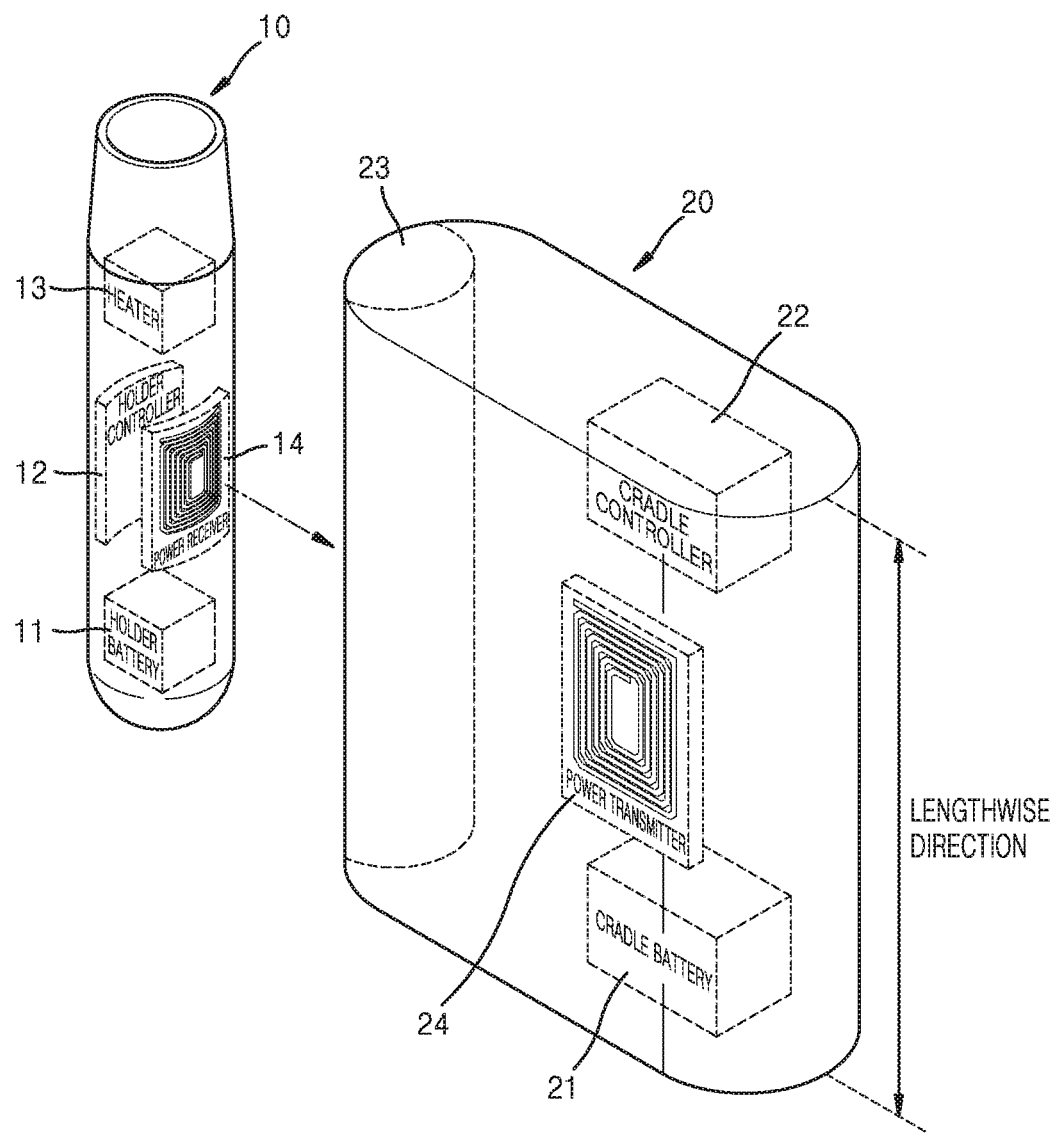
FIG. 13 is a diagram illustrating an operation of charging an aerosol generating device through a charging device, according to an embodiment.

FIG. 13 is a diagram illustrating an operation of charging an aerosol generating device through a charging device, according to an embodiment.

Referring to FIG. 13, the aerosol generating device 100 may be a holder 10 that holds an aerosol generating material inserted therein. The charging device 200 may be a cradle 20 including a cavity in which the aerosol generating device 100 may be accommodated. Descriptions on the aerosol generating device 100 given with reference to FIGS. 1 to 12 may apply to the holder 10, and descriptions on the charging device 200 given with reference to FIGS. 1 to 12 may apply to the cradle 20. In addition, descriptions on the holder 10 to be given with reference to FIGS. 13 to 18 may apply to the aerosol generating device 100, and descriptions on the cradle 20 to be given with reference to FIGS. 13 to 18 may apply to the charging device 200.

The holder 10 may include a holder battery 11, a holder controller 12, a heater 13, and a power receiver 14. Descriptions on the power supply 140 of the aerosol generating device 100 given with reference to FIGS. 1 to 12 may apply to the holder battery 11, descriptions on the controller 150 of the aerosol generating device 100 given with reference to FIGS. 1 to 12 may apply to the holder controller 12, and descriptions on the susceptor 110 given with reference to FIGS. 1 to 12 may apply to the heater 13. In addition, descriptions on the holder battery 11 to be given with reference to FIGS. 13 to 18 may apply to the power supply 140 of the aerosol generating device 100, descriptions on the holder controller 12 to be given with reference to FIGS. 13 to 18 may apply to the controller 150 of the aerosol generating device 100, and descriptions on the heater 13 to be given with reference to FIGS. 13 to 18 may apply to the susceptor 110.

The cradle 20 may include a cradle battery 21, a cradle controller 22, and a power transmitter 24. Descriptions on the power supply 280 of the charging device 200 given with reference to FIGS. 1 to 12 may apply to the cradle battery 21, descriptions on the controller 260 given with reference to FIGS. 1 to 12 may apply to the cradle controller 22, and descriptions on the transmission coil 220 given with reference to FIGS. 1 to 12 may apply to the power transmitter 24. In addition, descriptions on the cradle battery 21 to be given with reference to FIGS. 13 to 18 may apply to the power supply 280 of the charging device 200, descriptions on the cradle controller 22 to be given with reference to FIGS. 13 to 18 may apply to the controller 260, and descriptions on the power transmitter 24 to be given with reference to FIGS. 13 to 18 may apply to the transmission coil 220.

Internal structure of the holder 10 and the cradle 20 is not limited to the illustration of FIG. 13. Those skilled in the art may understand that depending on the design of the holder 10 and the cradle 20, some of the hardware components illustrated in FIG. 13 may be omitted, or a new component may be added thereto.

An inner space may be formed around the heater 13 of the holder 10, and a cigarette may be inserted into the inner space. When the cigarette is inserted into the holder 10, the holder 10 controls an output voltage of the holder battery 11 so that a temperature of the heater 13 rises. As an aerosol generating material in the cigarette is heated by the heater 13, an aerosol is generated.

A cavity 23 for accommodating the holder 10 may be formed in the cradle 20. The cavity 23 may be formed in a lengthwise direction of the cradle 20, and the holder 10 may be accommodated in the cavity 23 in a direction perpendicular to the lengthwise direction of the cradle 20, as illustrated in FIG. 1. Alternatively, the holder 10 may be accommodated in the cavity 23 in a direction parallel to the lengthwise direction of the cradle 20.

The holder battery 11 supplies electric power needed for the holder 10 to operate. For example, the holder battery 11 may supply electric power for the heater 13 to be heated. The holder battery 11 may also supply electric power needed for other hardware components provided within the holder 10 such as a sensor, user interface, memory, the holder controller 12, and the like to operate.

The cradle battery 21 supplies electric power needed for the cradle 20 to operate. For example, the cradle battery 21 may supply electric power to the holder battery 11 to charge the holder battery 11. When the holder 10 and the cradle 20 are coupled to each other, the cradle battery 21 may supply electric power needed for the holder 10 to operate. For example, when a terminal of the holder 10 and a terminal of the cradle 20 are coupled to each other, regardless of whether the holder battery 11 has discharged or not, the holder 10 may use electric power supplied by the cradle battery 21 to operate.

The holder battery 11 and the cradle battery 21 may include a rechargeable battery or a disposable battery. For example, the holder battery 11 and the cradle battery 21 may include a lithium iron phosphate (LiFePO4) battery, a lithium cobalt oxide (LiCoO2) battery, a lithium titanate battery, and a lithium polymer (LiPoly) battery. However, embodiments of the present disclosure are not limited thereto.

The heater 13 is supplied with electric power by the holder battery 11 under the control of the holder controller 12. The heater 13 may be supplied with electric power by the holder battery 11 to heat the cigarette inserted into the holder 10.

The heater 13 may be formed of any suitable electrically resistive material. For example, the suitable electrically resistive material may include a metal such as titanium, zirconium, tantalum, platinum, nickel, cobalt, chromium, hafnium, niobium, molybdenum, tungsten, tin, gallium, manganese, iron, copper, stainless steel, and nichrome, or an alloy thereof, but is not limited thereto. In addition, the heater 13 may be implemented with a metal wire, a metal plate on which an electrically conductive track is disposed, a ceramic heating element, and the like. However, embodiments of the present disclosure are not limited thereto.

According to an embodiment, the heater 13 may heat the cigarette inserted into an accommodation space of the holder 10. As the cigarette is accommodated in the accommodation space of the holder 10, the heater 13 may be located inside and/or outside the cigarette. Thus, the heater 13 may heat the aerosol generating material in the cigarette to generate the aerosol.

For example, the heater 13 may have a shape of a cylinder and a cone combined with each other. The heater 13 may be in a cylindrical shape having a diameter of about 2 mm and a length of about 23 mm, and an end of the heater 13 may have an acute angle. However, embodiments of the present disclosure are not limited thereto.

The heater 13 may include an induction heating-type heater. The heater 13 may include an electrically resistive coil for heating the cigarette through induction heating, and the cigarette may include a susceptor capable of being heated by the induction heating-type heater.

The holder 10 may include at least one sensor. A result sensed by the at least one sensor may be transmitted to the holder controller 12, and according to the sensed result, the holder controller 12 may control the holder 10 to execute a variety of functions such as control of the operation of the heater, restriction of smoking, determining of whether the cigarette is inserted or not, display of notification, and the like.

For example, the at least one sensor may include a puff detection sensor. The puff detection sensor may detect a user's puff based on any one of a temperature change, a flow change, a voltage change, and a pressure change.

The at least one sensor may also include a temperature detection sensor. The temperature detection sensor may detect a temperature at which the heater 13 (or, the aerosol generating material) is heated. The holder 10 may include a separate temperature detection sensor for detecting the temperature of the heater 13, or instead of the holder 10 including a separate temperature detection sensor, the heater 13 may serve as a temperature detection sensor. Alternatively, the holder 10 may further include a separate temperature detection sensor even if the heater 13 is able to serve as a temperature detection sensor.

The holder 10 may include a user interface. The user interface may provide a user with information on the state of the holder 10.

The user interface may include various interfacing means such as a display or lamp for outputting visual information, a motor for outputting tactile information, a speaker for outputting sound information, an input/output (I/O) interfacing means (e.g., button or touch screen) for receiving information input from the user or outputting information to the user, terminals for data communication or for receiving charging power, a communication interfacing module for performing wireless communication with an external device (e.g., Wi-Fi (wireless fidelity), Wi-Fi direct, blue-tooth, NFC (near-field communication)), and the like.

However, only some of the various user interface examples described above may be selected and implemented in the holder 10.

The holder controller 12 is hardware for controlling the overall operation of the holder 10. The holder controller 12 includes at least one processor. The processor may be implemented with an array of a plurality of logic gates, or may be implemented with a combination of a general-purpose microprocessor and a memory in which a program executable in the microprocessor is stored. In addition, those skilled in the art may understand that the processor may also be implemented with other types of hardware.

The holder controller 12 analyzes the result sensed by the at least one sensor and controls processes to be subsequently executed.

The holder controller 12 may control electric power supplied to the heater 13 such that the heater 13 starts or terminates operation, based on the result sensed by the at least one sensor. The holder controller 12 may control an amount of electric power supplied to the heater 13 and a period of time for which electric power is supplied to the heater 13 such that the heater 13 is heated to a certain temperature or maintains an appropriate temperature, based on the result sensed by the at least one sensor.

The holder controller 12 may control the user interface, based on the result sensed by the at least one sensor. For example, when the number of puffs is counted by the puff detection sensor reaches a preset number, the holder controller 12 may use at least any one of the lamp, motor, and speaker to notify the user that the holder 10 will be terminated soon.

The cradle controller 22 is hardware for controlling the overall operation of the cradle 20. The cradle controller 22 includes at least one processor. The processor may be implemented with an array of a plurality of logic gates, or may be implemented with a combination of a general-purpose microprocessor and a memory in which a program executable in the microprocessor is stored. In addition, those skilled in the art to which the present embodiment belongs may understand that the processor may also be implemented with other types of hardware.

The cradle controller 22 may control operation of all components of the cradle 20. In addition, the cradle controller 22 may determine whether the holder 10 and the cradle 20 are coupled to each other or not, and may control operation of the cradle 20 according to coupling or separation of the cradle 20 and the holder 10.

For example, when the holder 10 and the cradle 20 are coupled to each other, the cradle controller 22 may supply electric power of the cradle battery 21 to the holder 10 to charge the holder battery 11 or supply the electric power to the heater 13. Therefore, even when remaining capacity of the holder battery 11 is little, the user may couple the holder 10 to the cradle 20 to continue smoking.

The cradle 20 may include a display capable of outputting visual information. In this case, the cradle controller 22 may generate a signal to be displayed on the display to provide the user with information related to the cradle battery 21 (e.g., remaining capacity, availability, and the like of the cradle battery 21), information related to resetting of the cradle 20 (e.g., timing for resetting, progress of resetting, completion of resetting, and the like), information related to cleaning of the holder 10 (e.g., timing for cleaning, need of cleaning, progress of cleaning, completion of cleaning, and the like), information related to charging of the cradle 20 (e.g., need of charging, progress of charging, completion of charging, and the like), and the like.

In addition, the cradle 20 may include at least one input device (for example, a button) which allows the user to control functions of the cradle 20, a terminal for coupling with the holder 10, and/or an interface (for example, a universal serial bus (USB) port, etc.) for charging the cradle battery 21.

For example, the user may use the input device to execute various functions. The user may regulate a frequency of pressing the input device or a period of time for which the input device is pressed to execute desired functions of a plurality of functions of the cradle 20. As the user operates the input device, the cradle 20 may perform a function of preheating the heater 13 of the holder 10, a function of regulating the temperature of the heater 13 of the holder 10, a function of cleaning a space within the holder 10 into which the cigarette is inserted, and a function of checking whether the cradle 20 is operable or not. In addition, a function of displaying the remaining capacity (available power) of the cradle battery 21, a function of resetting the cradle 20, and the like may be executed. However, the functions of the cradle 20 are not limited thereto.

The holder 10 may include the power receiver 14, and the cradle 20 may include the power transmitter 24. The power transmitter 24 of the cradle 20 may use one or more wireless power transmission methods to wirelessly transmit electric power to the power receiver 14 of the holder 10 without any mutual contact. Examples of the wireless power transmission methods include, but are not limited to, inductive coupling and magnetic resonance coupling.

The power receiver 14 of the holder 10 is connected to the holder battery 11, and the power transmitter 24 of the cradle 20 is connected to the cradle battery 21. The power transmitter 24 of the cradle 20 wirelessly transmits electric power to the power receiver 14 of the holder 10, so that the holder battery 11 is charged.

According to one or more embodiments of the present disclosure, the location of the power transmitter 24 may be changed according to whether the holder 10 is accommodated in the cavity 23 of the cradle 20 or not. This will be described later with reference to FIGS. 16 and 17.

Figure 14:
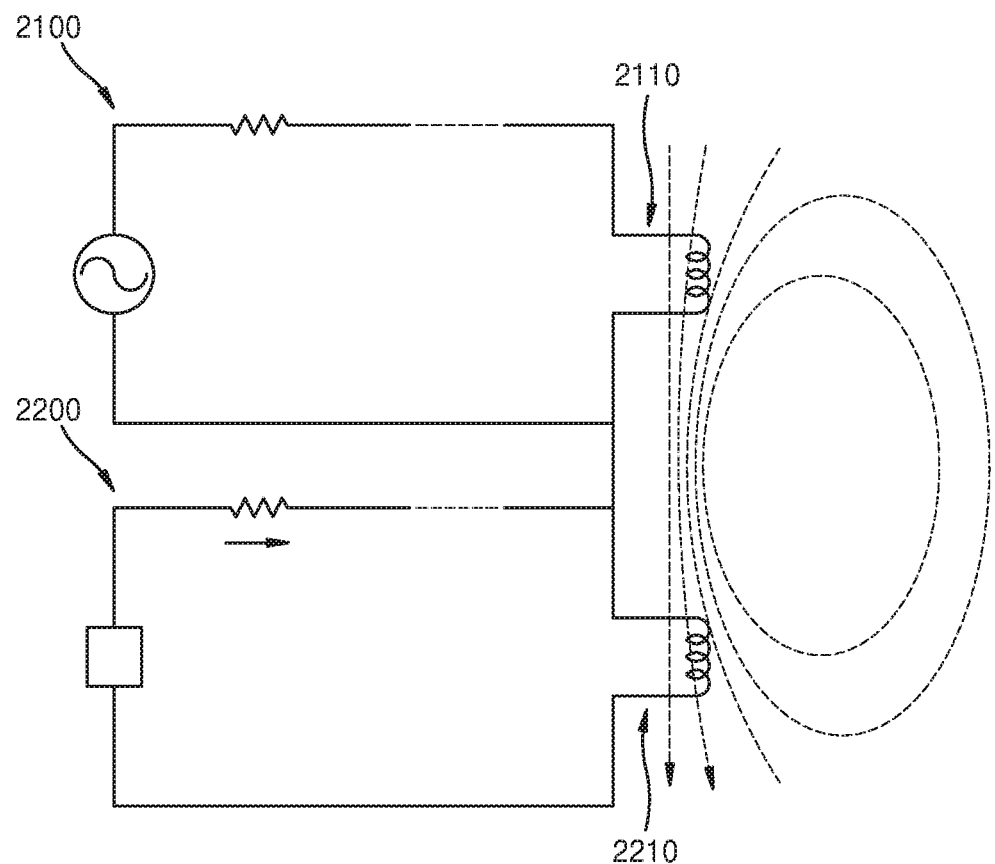
FIG. 14 is a conceptual diagram illustrating a power transmitter and a power receiver used for wireless charging, according to an embodiment.

FIG. 14 is a conceptual diagram of a power transmitter and a power receiver used for wireless charging, according to an embodiment.

A power transmitter 2100 may use one or more wireless power transmission methods to wirelessly transmit electric power to a power receiver 2200 without any mutual contact.

According to an embodiment, the power transmitter 2100 may transmit electric power to the power receiver 2200 by one or more methods from among inductive coupling based on magnetic induction by a wireless power signal and magnetic resonance coupling based on electromagnetic resonance by a wireless power signal of a specific frequency.

The wireless power transmission through the inductive coupling is a technique of wirelessly transmitting electric power using a primary coil and a secondary coil. In this case, a current is induced in a coil according to magnetic induction by an alternating magnetic field applied by the other coil, such that electric power is transferred.

The wireless power transmission through the magnetic resonance coupling refers to a method in which resonance occurs in the power receiver 2200 by the wireless power signal transmitted by the power transmitter 2100, and electric power is transmitted from the power transmitter 2100 to the power receiver 2200 by the resonance.

FIG. 14 illustrates that electric power is transmitted from the power transmitter 2100 to the power receiver 2200 by using the inductive coupling. The power transmitter 2100 includes a transmission coil (i.e., Tx coil) 2110 that operates as the primary coil in the magnetic induction, and the power receiver 2200 includes a reception coil (i.e., Rx coil) 2210 that operates as the secondary coil in the magnetic induction.

When the intensity of a current flowing through the transmission coil 2110 of the power transmitter 2100 changes, a magnetic field passing through the transmission coil 2110 changes. The change of the magnetic field passing through the transmission coil 2110 generates an induced electromotive force on the reception coil 2210 of the power receiver 2200. The electromotive force induced to the reception coil 2210 may be used to charge a battery of the power receiver 2200.

Figure 15:
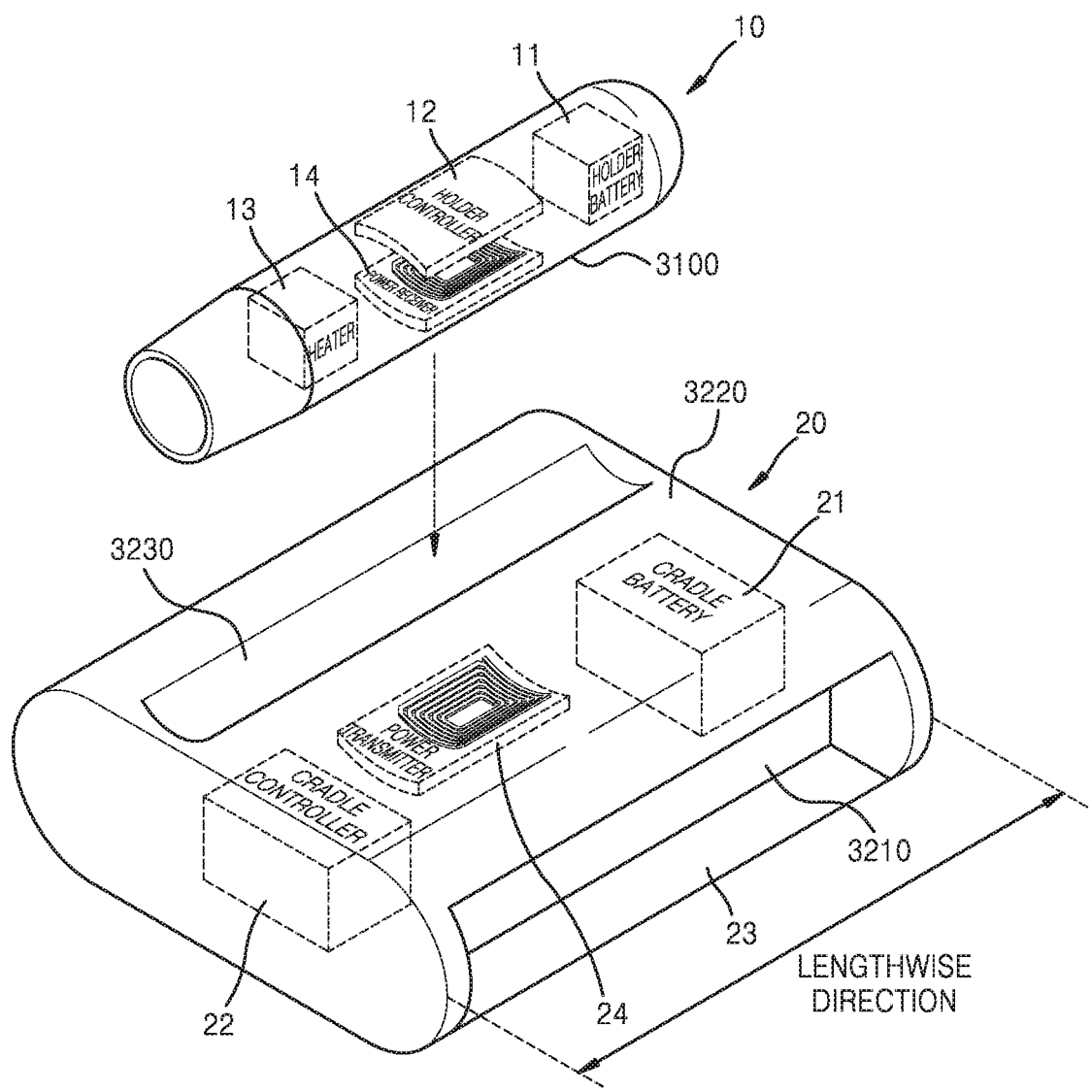
FIG. 15 is a diagram illustrating an example of an aerosol generating system before a holder is accommodated in a cradle, according to an embodiment.

FIG. 15 is a diagram illustrating an example of an aerosol generating system before a holder is accommodated in a cradle, according to an embodiment.

The cradle 20 includes a first side 3210 in parallel with a lengthwise direction of the cradle 20, and a second side 3220 perpendicular to the first side 3210. When the holder 10 is not accommodated in the cavity 23 of the cradle 20, the power transmitter 24 of the cradle 20 may be located to face the second side 3220.

The holder 10 may include a third side 3100 on which the power receiver 14 is located. For example, when the holder 10 is in a rectangular parallelepiped shape, the third side 3100 may include a rectangular cross section. Alternatively, when a cross section of the holder 10 is in a cylindrical shape, the third side 3100 may include a portion of a circumferential surface of the holder 10.

When the third side 3100 of the holder 10 is placed on the second side 3220 of the cradle 20, the power receiver 14 of the holder 10 and the power transmitter 24 of the cradle 20 may face each other. If the power receiver 14 receives electric power wirelessly from the power transmitter 24 while the power receiver 14 of the holder 10 and the power transmitter 24 of the cradle 20 are arranged to face each other, the charging efficiency of the holder battery 11 may be enhanced.

According to an embodiment, a first seating groove 3230 in which the holder 10 is able to be seated may be formed on the second side 3220 of the cradle 20. The first seating groove 3230 may prevent the holder 10 from being separated from the cradle 20. Even when the holder 10 is not accommodated in the cavity 23 of the cradle 20, the holder 10 may be seated in the first seating groove 3230, so that the power receiver 14 receives electric power wirelessly from the power transmitter 24.

Although not shown in FIG. 15, magnetic materials may be present inside the third side 3100 where the power receiver 14 is located and inside the first seating groove 3230. The power receiver 14 may be seated on the first seating groove 3230 to face the inside of the first seating groove 3230, by electromagnetic force of the magnetic materials. In addition, the holder 10 may be seated firmly in the first seating groove 3230 by the electromagnetic force of the magnetic materials. The magnetic materials may include materials such as permanent magnets, iron, nickel, cobalt, an alloy thereof, or the like. However, embodiments of the present disclosure are not limited thereto.

When the holder 10 is in a cylindrical shape, the first seating groove 3230 may be formed to correspond to the curvature of the circumferential surface of the holder 10.

Alternatively, when the holder 10 is in a rectangular parallelepiped shape, the first seating groove 3230 may be formed to correspond to a rectangular cross section of the holder 10. In other words, a shape of the first seating groove 3230 may be determined according to the shape of the holder 10.

The power receiver 14 and the power transmitter 24 may include a flexible printed circuit board (FPCB), and a coil on the FPCB. For example, the FPCB may include polyimide. As the power receiver 14 and the power transmitter 24 include FPCBs, the power receiver 14 and the power transmitter 24 may maintain a flat shape or may be curved flexibly.

When the holder 10 is in a cylindrical shape, the power receiver 14 of the holder 10 may be in a curved shape to correspond to the curvature of the third side 3100. When the first seating groove 3230 is formed on the second side 3220 of the cradle 20, the power transmitter 24 of the cradle 20 may be in a curved shape to correspond to the curvature of the first seating groove 3230. In that case, as the first seating groove 3230 is formed to correspond to the curvature of the third side 3100, the curvature of the power receiver 14 of the holder 10 and the curvature of the power transmitter 24 of the cradle 20 may correspond to each other. Accordingly, a corresponding area between the power receiver 14 and the power transmitter 24 is maximized. Therefore, when the power receiver 14 receives electric power wirelessly from the power transmitter 24, charging efficiency of the holder battery 11 may be enhanced.

Figure 16:
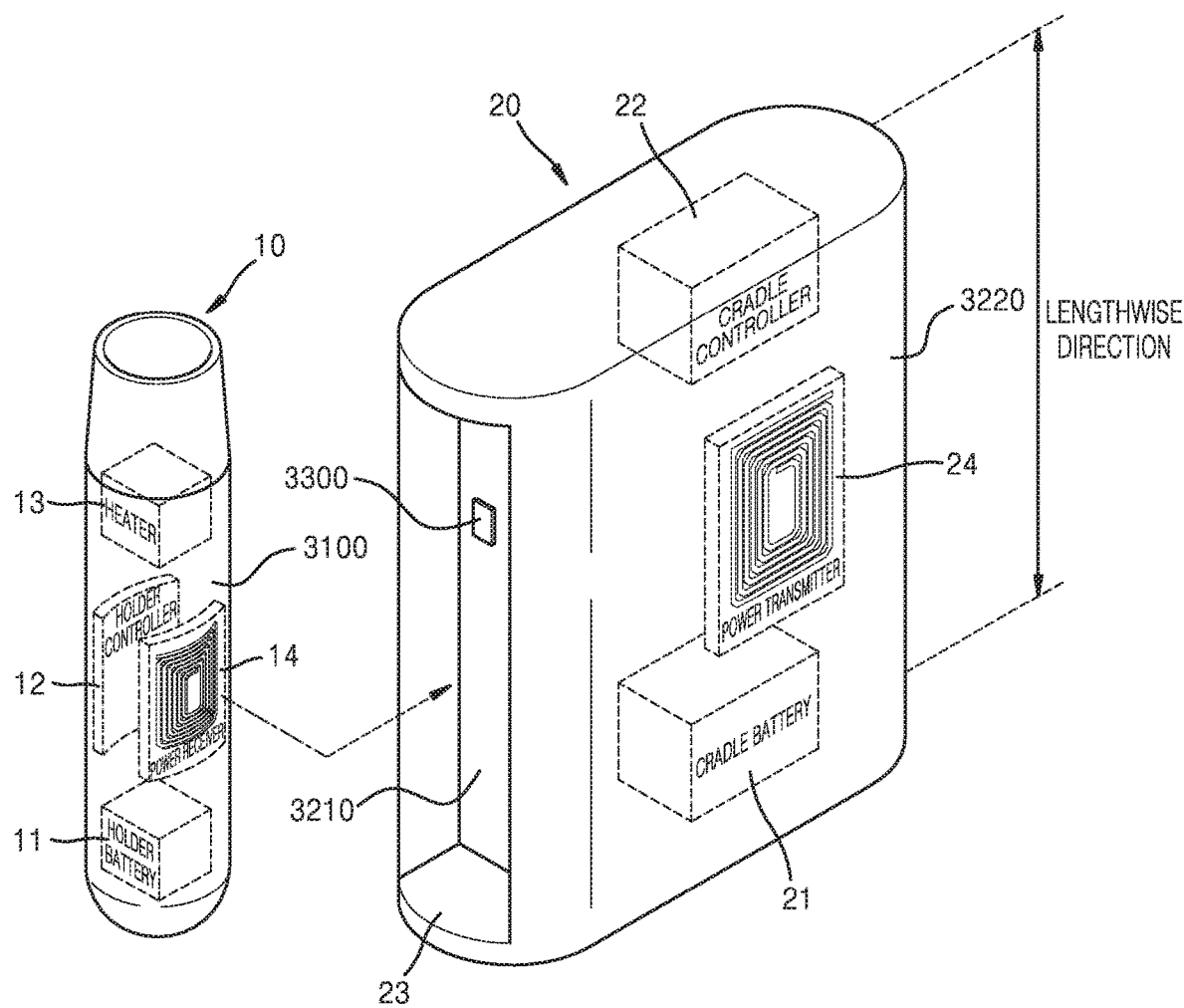
FIGS. 16 and 17 are diagrams illustrating examples of an aerosol generating system before and after a holder is accommodated in a cradle, according to an embodiment.
Figure 17:
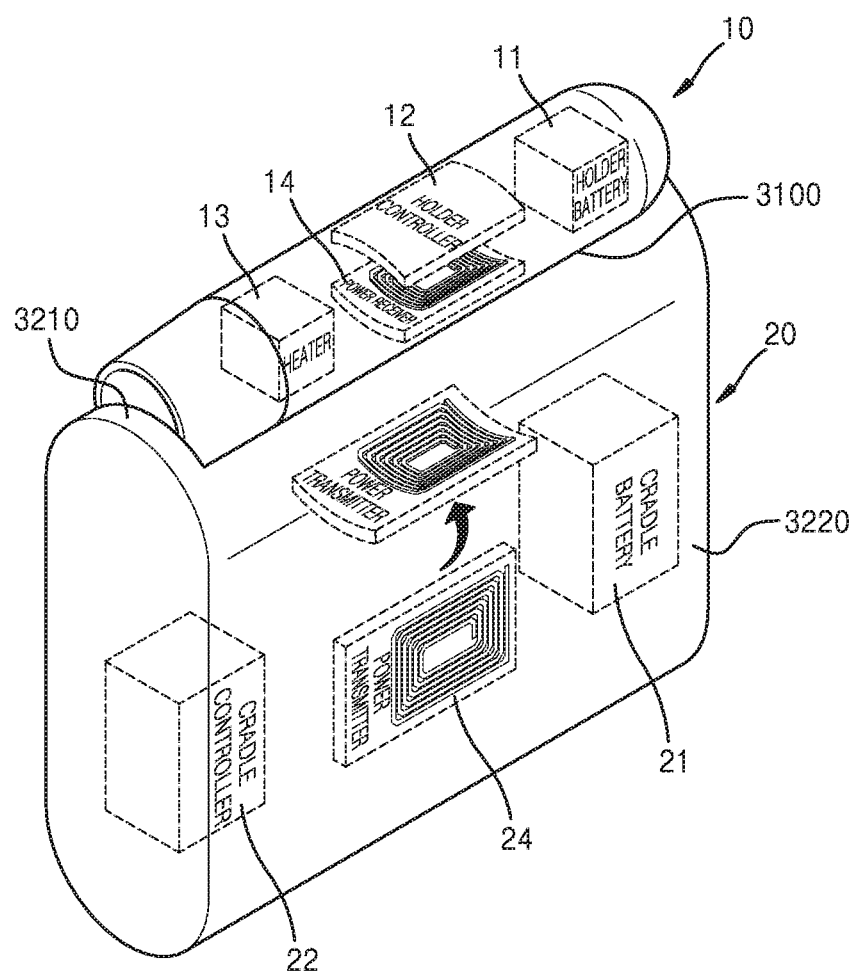

FIGS. 16 and 17 are diagrams illustrating examples of an aerosol generating system before and after a holder is accommodated in a cradle, according to an embodiment.

FIG. 16 illustrates an aerosol generating system before the holder 10 is accommodated in the cavity 23 of the cradle 20.

The cradle 20 includes the first side 3210 in parallel with a lengthwise direction of the cradle 20, and the second side 3220 perpendicular to the first side 3210. The holder 10 may include the third side 3100 on which the power receiver 14 is located. For example, when the holder 10 is in a rectangular parallelepiped shape, the third side 3100 may include a rectangular cross section. Alternatively, when a cross section of the holder 10 is in a cylindrical shape, the third side 3100 may include a portion of a circumferential surface of the holder 10.

When the holder 10 is not accommodated in the cavity 23 of the cradle 20, the power transmitter 24 of the cradle 20 may be located to face the second side 3220 (hereinafter referred to as the second position) as illustrated in FIG. 16.

As such, even when the holder 10 is not accommodated in the cavity 23 of the cradle 20, the power receiver 14 and the power transmitter 24 located on the second position may be arranged to face each other by placing the third side 3100 of the holder 10 on the second side 3220 of the cradle 20. Since the power receiver 14 of the holder 10 and the power transmitter 24 of the cradle 20 are arranged to face each other, when the power receiver 14 receives electric power wirelessly from the power transmitter 24, charging efficiency of the holder battery 11 may be enhanced.

Although not shown in FIG. 16, the first seating groove in which the holder 10 is able to be seated may be formed on the second side 3220 of the cradle 20. The first seating groove 3230 may prevent the holder 10 from being separated from the cradle 20.

The cradle 20 may include a holder accommodation detection sensor 3300 for detecting whether or not the holder 10 is accommodated in the cavity 23. When the holder accommodation detection sensor 3300 detects that the holder 10 has been accommodated in the cavity 23, the location of the power transmitter 24 of the cradle 20 may be changed.

For example, if the holder accommodation detection sensor 3300 includes a push-type switch, when the holder 10 is inserted into the cavity 23, the holder accommodation detection sensor 3300 may be pushed into the cradle 20. In this case, the cradle 20 may detect that the holder 10 is accommodated in the cavity 23, and change the location of the power transmitter 24.

The holder accommodation detection sensor 3300 may include a capacitance detection sensor, a hall-effect sensor, a magneto-resistor, or the like. However, embodiments of the present disclosure are not limited thereto.

FIG. 17 illustrates an aerosol generating system after the holder 10 is accommodated in the cavity 23 of the cradle 20.

When the holder 10 is accommodated in the cavity 23 of the cradle 20, the power transmitter 24 of the cradle 20 may be located to face the first side 3210 (hereinafter referred to as the first position), as illustrated in FIG. 17.

That is, when the holder 10 is accommodated in the cavity 23 of the cradle 20, the third side 3100 of the holder 10 may be located on the first side 3210 of the cradle 20, such that the power receiver 14 and the power transmitter 24 at the first position are arranged to face each other. Since the power receiver 14 of the holder 10 and the power transmitter 24 of the cradle 20 are arranged to face each other, when the power receiver 14 receives electric power wirelessly from the power transmitter 24, charging efficiency of the holder battery 11 may be enhanced.

Although not illustrated in FIGS. 16 and 17, magnetic materials may be present inside the third side 3100 on which the power receiver 14 is located and inside the first side 3210 of the cavity 23. The power receiver 14 may be accommodated in the cavity 23 to face the inside of the first side 3210, by electromagnetic force of the magnetic materials. In addition, the holder 10 may be accommodated firmly in the cavity 23 by the electromagnetic force of the magnetic materials. The magnetic materials may include materials such as permanent magnets, iron, nickel, cobalt, an alloy thereof, or the like. However, embodiments of the present disclosure are not limited thereto.

The power transmitter 24 of the cradle 20 may be movable between the first position where the power transmitter 24 faces the first side 3210 inside the cradle 20 and the second position where the power transmitter 24 faces the second side 3220 inside the cradle 20. As the power transmitter 24 is moved between the first position and the second position, a shape of the power transmitter 24 may be changed.

According to an embodiment, the power receiver 14 and the power transmitter 24 may include a FPCB and a coil on the FPCB. As the power receiver 14 and the power transmitter 24 include FPCBs, the power receiver 14 and the power transmitter 24 may maintain a flat shape, or may be curved flexibly.

When the second side 3220 is flat, the power transmitter 24 at the second position may be in a flat shape. As the holder 10 is accommodated in the cavity 23 of the cradle 20, the power transmitter 24 may be moved from the second position to the first position, and the power transmitter 24 may be in a curved shape to correspond to the curvature of the first side 3210. In other words, as the power transmitter 24 is moved from the second position to the first position, the power transmitter 24 may be changed from the flat shape to the curved shape.

Alternatively, if the first seating groove 3230 is formed on the second side 3220 as illustrated in FIG. 15, the power transmitter 24 at the second position may be in a curved shape to correspond to the curvature of the first seating groove 3230. As the holder 10 is accommodated in the cavity 23 of the cradle 20, the power transmitter 24 may be moved from the second position to the first position, and the power transmitter 24 may be in a curved shape to correspond to the curvature of the first side 3210. In that case, depending on the difference between the curvature of the first seating groove 3230 and the curvature of the first side 3210, a degree to which the power transmitter 24 is curved may be changed, or may remain the same.

According to the present embodiment, the location of the power transmitter 24 of the cradle 20 may be changed according to whether or not the holder 10 is accommodated in the cavity 23 of the cradle 20. As such, the power receiver 14 of the holder 10 and the power transmitter 24 of the cradle 20 may be arranged to face each other, whether or not the holder 10 is accommodated in the cavity 23. Thus, when the power receiver 14 receives electric power wirelessly from the power transmitter 24, charging efficiency of the holder battery 11 may be enhanced.

In addition, according to the present embodiment, the power receiver 14 of the holder 10 and the power transmitter 24 of the cradle 20 may include FPCBs, so that a degree to which the power receiver 14 and the power transmitter 24 are curved is changed to increase the corresponding area. Therefore, when the power receiver 14 receives electric power wirelessly from the power transmitter 24, charging efficiency of the holder battery 11 may be enhanced.

Figure 18:
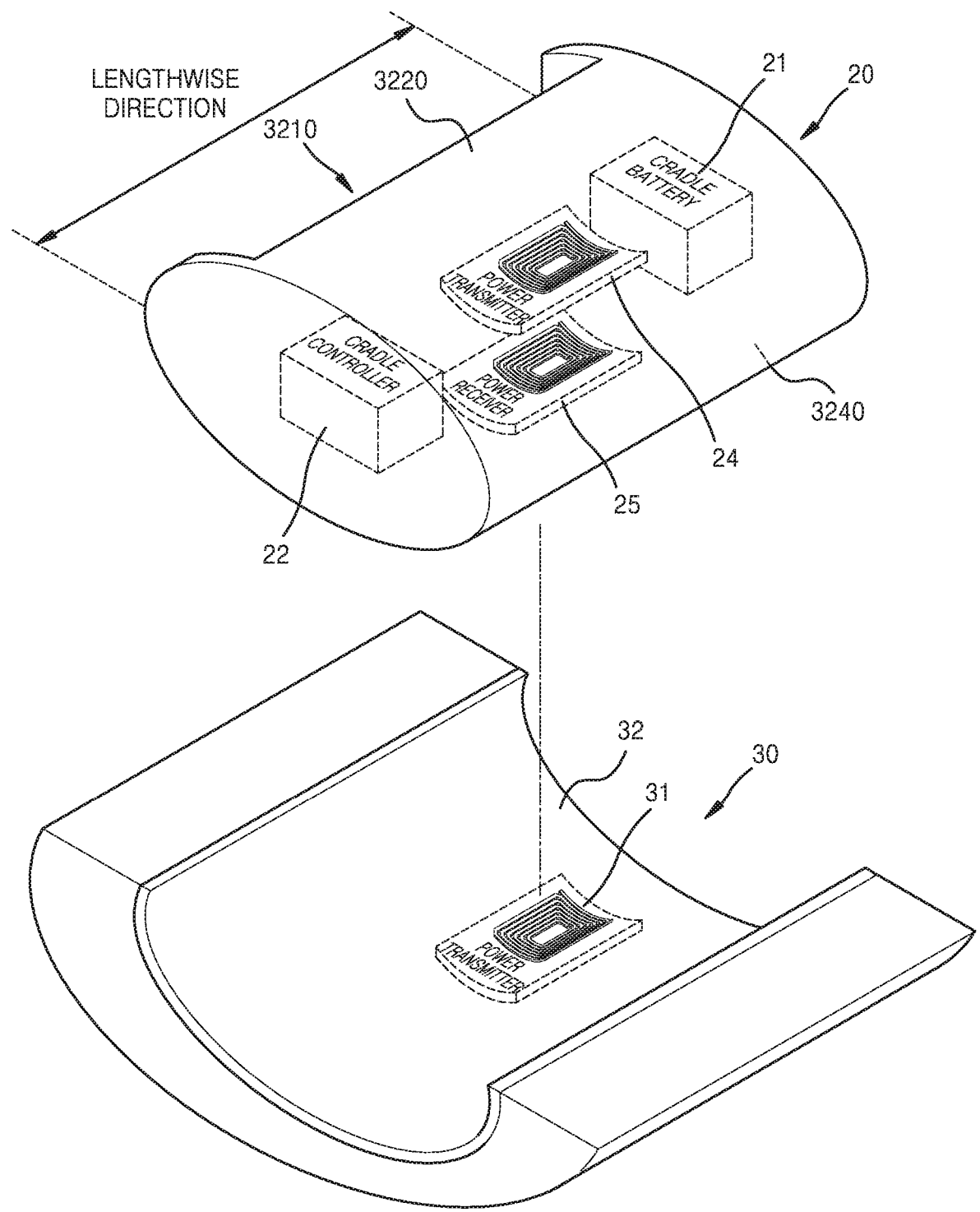
FIG. 18 is a diagram illustrating an example in which a cradle is seated on a wireless charging pad, according to an embodiment.

FIG. 18 is a diagram illustrating an example in which a cradle is seated on a wireless charging pad, according to an embodiment.

Referring to FIG. 18, an external power source may include a wireless charging pad 30, according to an embodiment. However, the external power source is not limited to the wireless charging pad 30, and may include various power storage devices such as a rechargeable battery that may be recharged by a wire.

The cradle 20 includes the first side 3210 in parallel with a lengthwise direction of the cradle 20, and the second side 3220 and a fourth side 3240 that are perpendicular to the first side 3210. In other words, the second side 3220 and the fourth side 3240 are located to face each other.

The cradle 20 includes the cradle battery 21, the cradle controller 22, the power transmitter 24, and a power receiver 25. However, internal configuration of the cradle 20 is not limited to the illustration of FIG. 18.

The power transmitter 24 of the cradle 20 may be located to face the second side 3220, and the power receiver 25 of the cradle 20 may be located to face the fourth side 3240. As illustrated in FIG. 18, the power receiver 25 and the power transmitter 24 may be located practically in parallel with each other within the cradle 20.

As described above with reference to FIGS. 16 and 17, the power transmitter 24 of the cradle 20 may transmit electric power wirelessly to the power receiver 14 of the holder 10 to charge the holder battery 11.

The power receiver 25 of the cradle 20 may receive electric power wirelessly from an external power transmitter to charge the cradle battery 21. The external power transmitter may be a power transmitter 31 included within the wireless charging pad 30.

The power receiver 25 of the cradle 20 may receive electric power wirelessly from the wireless charging pad 30 including the power transmitter 31. When the fourth side 3240 of the cradle 20 is located on one side of the wireless charging pad 30, the power receiver 25 of the cradle 20 and the power transmitter 31 of the wireless charging pad 30 may be arranged to face each other.

According to an embodiment, a second seating groove 32 in which the cradle 20 is able to be seated may be formed on one side of the wireless charging pad 30. The second seating groove 32 may prevent the cradle 20 from being separated from the wireless charging pad 30.

When the cradle 20 is in a cylindrical shape, the second seating groove 32 may be formed to correspond to the curvature of a circumferential surface of the cradle 20. Alternatively, when the cradle 20 is in a rectangular parallelepiped shape, the second seating groove 32 may be formed to correspond to a rectangular cross section of the cradle 20. In other words, depending on the shape of the cradle 20, a shape of the second seating groove 32 may be determined.

Although not illustrated in FIG. 18, magnetic materials may be present inside the fourth side 3240 on which the power receiver 25 of the cradle 20 is located, and inside the second seating groove 32. The power receiver 25 of the cradle 20 may be seated in the second seating groove 32 to face the inside of the second seating groove 32, by electromagnetic force of the magnetic materials. In addition, the cradle 20 may be seated firmly in the second seating groove 32 by the electromagnetic force of the magnetic materials. The magnetic materials may include materials such as permanent magnets, iron, nickel, cobalt, an alloy thereof, or the like. However, embodiments of the present disclosure are not limited thereto.

The power receiver 25 of the cradle 20 and the power transmitter 31 of the wireless charging pad 30 may include a FPCB, and a coil on the FPCB. For example, the FPCB may include polyimide. As the power receiver 25 of the cradle 20 and the power transmitter 31 of the wireless charging pad 30 include FPCBs, the power receiver 25 and the power transmitter 31 may maintain a flat shape, or may be curved flexibly.

According to an embodiment, when the cradle 20 is in a cylindrical shape, the power receiver 25 of the cradle 20 may be in a curved shape to correspond to the curvature of the fourth side 3240. In addition, the power transmitter 31 of the wireless charging pad 30 may be in a curved shape to correspond to the curvature of the second seating groove 32. If the second seating groove 32 is formed to correspond to the curvature of the fourth side 3240, the curvature of the power receiver 25 of the cradle 20 and the curvature of the power transmitter 31 of the wireless charging pad 30 may correspond to each other. Accordingly, a corresponding area between the power receiver 25 and the power transmitter 31 is maximized. Thus, when the power receiver 25 receives electric power wirelessly from the power transmitter 31, charging efficiency of the cradle battery 21 may be enhanced.

Although not illustrated in FIG. 18, while the holder 10 is accommodated in the cradle 20, the cradle 20 and the holder 10 may be placed on one side of the wireless charging pad 30.

In that case, the power receiver 25 of the cradle 20 may receive electric power wirelessly from the power transmitter 31 of the wireless charging pad 30 to charge the cradle battery 21.

In addition, as described above with reference to FIG. 17, as the holder 10 is accommodated in the cradle 20, the location of the power transmitter 24 of the cradle 20 is changed to face the power receiver 14. As such, the power receiver 14 of the holder 10 may receive electric power wirelessly from the power transmitter 24 of the cradle 20. As a result, the holder battery 11 may be charged.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating system comprising:
a charging pad comprising a first power transmitter;
a charging device comprising a first power receiver, a second power transmitter, and an electric power source; and
at least a portion of an aerosol generating device comprising a second power receiver and a power supply,
wherein the charging pad is configured to inductively charge the electric power source through a magnetic field generated by the first power transmitter and affecting the first power receiver; and
the charging device is configured to inductively charge the power supply through a magnetic field generated by the second power transmitter affecting the second power receiver.

2. The aerosol generating system of claim 1, wherein
the second power receiver of the aerosol generating device comprises an induction coil configured to perform:
a heating operation for heating a susceptor arranged in a cigarette insertion portion of the aerosol generating device, and
a charging operation for receiving electric power to charge the power supply, and
the second power transmitter of the charging device comprises a transmission coil configured to transmit electric power to the induction coil of the aerosol generating device.

3. The aerosol generating system of claim 2, wherein the aerosol generating device selectively performs one of the heating operation and the charging operation through the induction coil.

4. The aerosol generating system of claim 2, wherein
the charging device further includes a first impedance matching portion connected to the transmission coil,
the aerosol generating device further comprises a second impedance matching portion connected to the induction coil, and
an impedance value of the second impedance matching portion is a value between an impedance value of the susceptor and an impedance value of the first impedance matching portion.

5. The aerosol generating system of claim 2, wherein
the aerosol generating device further comprises a heating impedance matching portion having a first impedance value for applying a magnetic field to the susceptor during the heating operation, and a reception impedance matching portion having a second impedance value for receiving electric power from the charging device during the charging operation, and
the charging device further comprises a transmission impedance matching portion that is connected to the transmission coil and has the second impedance value.

6. The aerosol generating system of claim 2, wherein central axes of the induction coil and the transmission coil are aligned such that the charging operation is performed.

7. The aerosol generating system of claim 2, wherein the induction coil and the transmission coil are arranged to overlap at least in part such that the charging operation is performed.

8. The aerosol generating system of claim 2, wherein the transmission coil is inserted into the cigarette insertion portion for the charging operation.

9. The aerosol generating system of claim 2, wherein, when the charging device is coupled for the charging operation, the induction coil and the transmission coil are spaced apart in an axial direction.

10. The aerosol generating system of claim 2, wherein the charging pad comprises an external power source comprising the first power transmitter, and
wherein the electric power source of the charging device comprises a rechargeable battery.

11. The aerosol generating system of claim 10, wherein
the charging device comprises a cavity in which the aerosol generating device is accommodated, and
a location of the transmission coil is changed according to whether the aerosol generating device is accommodated in the cavity.

12. An method of charging an aerosol generating system, the method comprising:
inductively charging an electric power source of a charging device through a magnetic field generated by a first power transmitter of a charging pad and affecting a first power receiver of the charging device; and
inductively charging a power supply of an aerosol generating device through a magnetic field generated by a second power transmitter of the charging device and affecting a second power receiver of the aerosol generating device.

13. The method of claim 12, wherein the second power receiver of the aerosol generating device includes an induction coil, the method further comprising:
selecting a mode for the aerosol generating device from one of;
a charging mode for receiving electric power through the induction coil to charge the power supply, and
a heating mode for heating a susceptor by generating a magnetic field in the induction coil;
in the charging mode, performing the inductive charging of the power supply by receiving electric power through the induction coil, and
in the heating mode, heating the susceptor through the induction coil.

* * * * *